US012581032B2

(12) United States Patent
Kim et al.

(10) Patent No.:  US 12,581,032 B2
(45) Date of Patent:      Mar. 17, 2026

(54) ELECTRONIC DEVICE FOR AUDIO RECORDING AND OPERATING METHOD THEREOF

(71) Applicant: Samsung Electronics Co., Ltd., Suwon-si (KR)

(72) Inventors: Seongbok Kim, Suwon-si (KR); Jinho Kim, Suwon-si (KR); Gupil Cheong, Suwon-si (KR); Euibum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 18/601,270

(22) Filed: Mar. 11, 2024

(65) Prior Publication Data

US 2024/0212719 A1      Jun. 27, 2024

Related U.S. Application Data

(63) Continuation of application No. PCT/KR2022/014358, filed on Sep. 26, 2022.

(30) Foreign Application Priority Data

Oct. 15, 2021      (KR) ........................ 10-2021-0137805

(51) Int. Cl.
*H04N 7/14*          (2006.01)
*H04N 7/15*          (2006.01)
(Continued)

(52) U.S. Cl.
CPC .............. *H04N 7/142* (2013.01); *H04N 7/15* (2013.01); *H04N 23/631* (2023.01);
(Continued)

(58) Field of Classification Search
None
See application file for complete search history.

(56) References Cited

U.S. PATENT DOCUMENTS

2015/0163587 A1      6/2015  Li
2015/0172561 A1      6/2015  Lee et al.
(Continued)

FOREIGN PATENT DOCUMENTS

EP            3879848 A1        9/2021
JP        2005-136569 A        5/2005
(Continued)

OTHER PUBLICATIONS

International Search Report dated Jan. 3, 2023, issued in International Patent Application No. PCT/KR2022/014358.
(Continued)

*Primary Examiner* — Quoc D Tran
(74) *Attorney, Agent, or Firm* — Jefferson IP Law, LLP

(57)          ABSTRACT

An electronic device is provided. The electronic device includes a first camera, a second camera, a display, a communication circuit, memory storing one or more computer programs, and one or more processors communicatively coupled to the first camera, the second camera, the display, the communication circuit, and the memory, wherein the one or more computer programs include computer-executable instructions that, when executed by the one or more processors, cause the electronic device to display a first image obtained from the first camera and a second image obtained from the second camera through the display in a multiple camera recording mode, display an audio input selection screen related to a plurality of audio inputs through the display, wherein the audio input selection screen includes an item to select a microphone of the electronic device and an item to select an external electronic device connected to the electronic device through at least one
(Continued)

Bluetooth communication link, receive a first user input for selecting an external electronic device through the audio input selection screen, in response to the first user input, establish first and second communication links for supporting binaural recording with first and second ear buds included in the external electronic device, through the communication circuit, receive first and second audio data obtained from the first and second ear buds through the first and second communication links, respectively, while performing a recording using the first camera and the second camera simultaneously, and store first and second images obtained from the first and second cameras in synchronization with the first and second audio data.

20 Claims, 22 Drawing Sheets

(51) Int. Cl.
| | |
|---|---|
| *H04N 23/63* | (2023.01) |
| *H04N 23/661* | (2023.01) |
| *H04R 3/00* | (2006.01) |
| *H04R 1/10* | (2006.01) |
| *H04R 5/033* | (2006.01) |

(52) U.S. Cl.
CPC .......... *H04N 23/661* (2023.01); *H04R 3/005* (2013.01); *H04M 2250/02* (2013.01); *H04M 2250/52* (2013.01); *H04R 1/1016* (2013.01); *H04R 5/033* (2013.01); *H04R 2420/07* (2013.01)

(56) References Cited

U.S. PATENT DOCUMENTS

| | | | |
|---|---|---|---|
| 2015/0379098 A1 | 12/2015 | Im et al. | |
| 2016/0080684 A1* | 3/2016 | Farrell ..................... | H04N 5/77 |
| | | | 386/227 |
| 2016/0182799 A1 | 6/2016 | Laaksonen et al. | |
| 2017/0026610 A1 | 1/2017 | Kwon et al. | |
| 2017/0055072 A1 | 2/2017 | Kim et al. | |
| 2018/0139530 A1* | 5/2018 | Marrin ................... | H04R 5/027 |
| 2018/0262747 A1 | 9/2018 | Meirlaen | |
| 2020/0014830 A1 | 1/2020 | Li | |
| 2022/0368554 A1* | 11/2022 | Williams ............ | H04L 12/1818 |
| 2023/0116044 A1 | 4/2023 | Han | |
| 2025/0078858 A1* | 3/2025 | Cengarle ............ | G10L 21/0364 |

FOREIGN PATENT DOCUMENTS

| | | |
|---|---|---|
| KR | 10-2014-0060003 A | 5/2014 |
| KR | 10-2015-0066455 A | 6/2015 |
| KR | 10-2016-0001359 A | 1/2016 |
| KR | 10-2017-0010485 A | 2/2017 |
| KR | 10-2017-0022727 A | 3/2017 |
| KR | 10-2017-0037462 A | 4/2017 |
| KR | 10-2017-0100582 A | 9/2017 |
| KR | 10-2019-0091824 A | 8/2019 |
| WO | 2019-123149 A1 | 6/2019 |
| WO | 2021/175197 A1 | 9/2021 |

OTHER PUBLICATIONS

Extended European Search Report dated Nov. 25, 2024, issued in European Application No. 22881250.9-1218.

* cited by examiner

| Type | Payload Header (bytes) | User Payload (bytes) | FEC | MIC | CRC | Symmetric Max. Rate (kb.s) |
|------|------------------------|----------------------|-----|-----|-----|----------------------------|
| HV1 | N/A | 10 | 1/3 | No | No | 64.0 |
| HV2 | N/A | 20 | 2/3 | No | No | 64.0 |
| HV3 | 1 D | 30 | no | No | No | 64.0 |
| DV | N/A | 10+(9-9) D | 2/3 D | No | Yes D | 64.0 + 57.6 D |
| EV3 | N/A | 1-30 | No | No | Yes | 96 |
| EV4 | N/A | 1-120 | 2/3 | No | Yes | 192 |
| EV5 | N/A | 1-180 | No | No | Yes | 288 |
| 2-EV3 | N/A | 1-60 | No | No | Yes | 192 |
| 2-EV5 | N/A | 1-360 | No | No | Yes | 576 |
| 3-EV3 | N/A | 1-90 | No | No | Yes | 288 |
| 3-EV5 | N/A | 1-540 | No | No | Yes | 864 |

602 (brace for rows HV1–DV)
604 (brace for rows EV3–3-EV5)

FIG. 6

ELECTRONIC DEVICE FOR AUDIO RECORDING AND OPERATING METHOD THEREOF

CROSS-REFERENCE TO RELATED APPLICATION(S)

This application is a continuation application, claiming priority under § 365(c), of an International application No. PCT/KR2022/014358, filed on Sep. 26, 2022, which is based on and claims the benefit of a Korean patent application number 10-2021-0137805, filed Oct. 15, 2021, in the Korean Intellectual Property Office, the disclosure of which is incorporated by reference herein in its entirety.

BACKGROUND

1. Field

The disclosure relates to an electronic device for audio recording and a method of operating the same.

2. Description of Related Art

Bluetooth communication technology may refer to a short-range wireless communication technology that enables electronic devices to connect to each other to exchange data or information. The Bluetooth communication technology may include Bluetooth legacy (or classic) communication technology or Bluetooth low energy (BLE) communication technology, and have various connection types of topologies, such as piconet or scatternet.

Recently, electronic devices using the Bluetooth communication technology have been widely used. For example, a pair of earbuds wearable on both ears of a user are widely used as a Bluetooth-based binaural wireless audio device. The binaural wireless audio device may provide a variety of functions. For example, the binaural wireless audio device may include a microphone to identify a user's voice and transmit data of the user's voice to an electronic device (e.g., a smartphone). In addition, the binaural wireless audio device may include a speaker and output audio data received from the electronic device (e.g., a smartphone) through the speaker.

The binaural wireless audio device may include a primary earbud (e.g., a right earbud) and a secondary earbud (e.g., a left earbud) connectable to the electronic device (e.g., a smartphone). The primary earbud may transmit audio data to the electronic device through a connection to the electronic device, and the electronic device may transmit audio data (or audio content) to the primary earbud. The primary earbud may forward audio data (or audio content) received from the electronic device through wireless communication to the secondary earbud and output the audio data through the speaker. The secondary earbud may be synchronized with the primary earbud and output audio data received from the primary earbud or the electronic device through a speaker.

The above information is presented as background information only to assist with an understanding of the disclosure. No determination has been made, and no assertion is made, as to whether any of the above might be applicable as prior art with regard to the disclosure.

SUMMARY

An electronic device with a camera, for example, a smartphone records a video or perform a video call using the camera. To provide better video recording quality, the electronic device supports multiple camera recording involving simultaneous use of both a front camera and a rear camera. In multiple camera recording, the electronic device operates the front camera and the rear camera simultaneously, and store and play an image from the front camera and an image from the rear camera separately, or mix the two images for play and storage.

The electronic device records an ambient audio using its own microphone included in the electronic device while performing simultaneous recoding through the front camera and the rear camera. Herein, the electronic device is not able to distinguishably record an audio corresponding to the front camera and an audio corresponding to the rear camera. For example, when the electronic device records audios for the front and rear cameras using only its own microphone while capturing images of two or more speakers through the front and rear cameras, respectively, voice or noise from a speaker closer to the microphone is introduced louder, causing imbalance in the loudness of audios from different speakers input to any one image.

When the electronic device receives audio data from a binaural wireless audio device, even if both earbuds have microphones, respectively, only monaural audio data from a primary earbud is transmitted to the electronic device, resulting in the degraded audio quality of an image captured by the electronic device.

Aspects of the disclosure are to address at least the above-mentioned problems and/or disadvantages and to provide at least the advantages described below. Accordingly, an aspect of the disclosure is to provide an electronic device for audio recording and operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a first camera, a second camera, a display, a communication circuit, memory storing one or more computer programs, and one or more processors communicatively coupled to the first camera, the second camera, the display, the communication circuit, and the memory, wherein the one or more computer programs include computer-executable instructions that, when executed by the one or more processors, cause the electronic device to display a first image obtained from the first camera and a second image obtained from the second camera through the display in a multiple camera recording mode, display an audio input selection screen related to a plurality of audio inputs through the display, wherein the audio input selection screen includes an item to select a microphone of the electronic device and an item to select an external electronic device connected to the electronic device through at least one Bluetooth communication link, receive a first user input selecting the external electronic device through the audio input selection screen, in response to the first user input, establish a first communication link and a second communication link for supporting binaural recording with a first earbud and a second earbud included in the external electronic device, respectively, through the communication circuit, receive first audio data obtained from the first earbud through the first communication link, receive second audio data obtained from the second earbud through the second communication link, while performing a recording using the first camera and the second camera simultaneously, store the first image in synchronization with the first audio data, and store the second image in synchronization with the second audio data.

In accordance with another aspect of the disclosure, an audio recording method performed by an electronic device is provided. The method includes displaying a first image obtained from a first camera and a second image obtained from a second camera through a display in a multiple camera recording mode, displaying an audio input selection screen related to a plurality of audio inputs through the display, wherein the audio input selection screen includes an item to select a microphone of the electronic device and an item to select an external electronic device connected to the electronic device through at least one Bluetooth communication link, receiving a first user input selecting the external electronic device through the audio input selection screen, in response to the first user input, establishing a first communication link and a second communication link for supporting binaural recording with a first earbud and a second earbud included in the external electronic device, respectively, receiving first audio data obtained from the first earbud through the first communication link, and receiving second audio data obtained from the second earbud through the second communication link, while performing a recording using the first camera and the second camera simultaneously, and storing the first image in synchronization with the first audio data, and storing the second image in synchronization with the second audio data.

In accordance with another aspect of the disclosure, one or more non-transitory computer-readable storage media storing computer-executable instructions that, when executed by one or more processors of an electronic device, cause the electronic device to perform operations are provided. The operations include displaying a first image obtained from the first camera and a second image obtained from the second camera through the display in a multiple camera recording mode, displaying an audio input selection screen related to a plurality of audio inputs through the display, wherein the audio input selection screen includes an item to select a microphone of the electronic device and an item to select an external electronic device connected to the electronic device through at least one Bluetooth communication link, receiving a first user input selecting the external electronic device through the audio input selection screen, establishing, in response to the first user input, a first communication link and a second communication link for supporting binaural recording with a first earbud and a second earbud included in the external electronic device, respectively, through the communication circuit, receiving first audio data obtained from the first earbud through the first communication link, and receiving second audio data obtained from the second earbud through the second communication link, while performing a recording using the first camera and the second camera simultaneously, storing the first image in synchronization with the first audio data, and storing the second image in synchronization with the second audio data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating types of Bluetooth packets according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
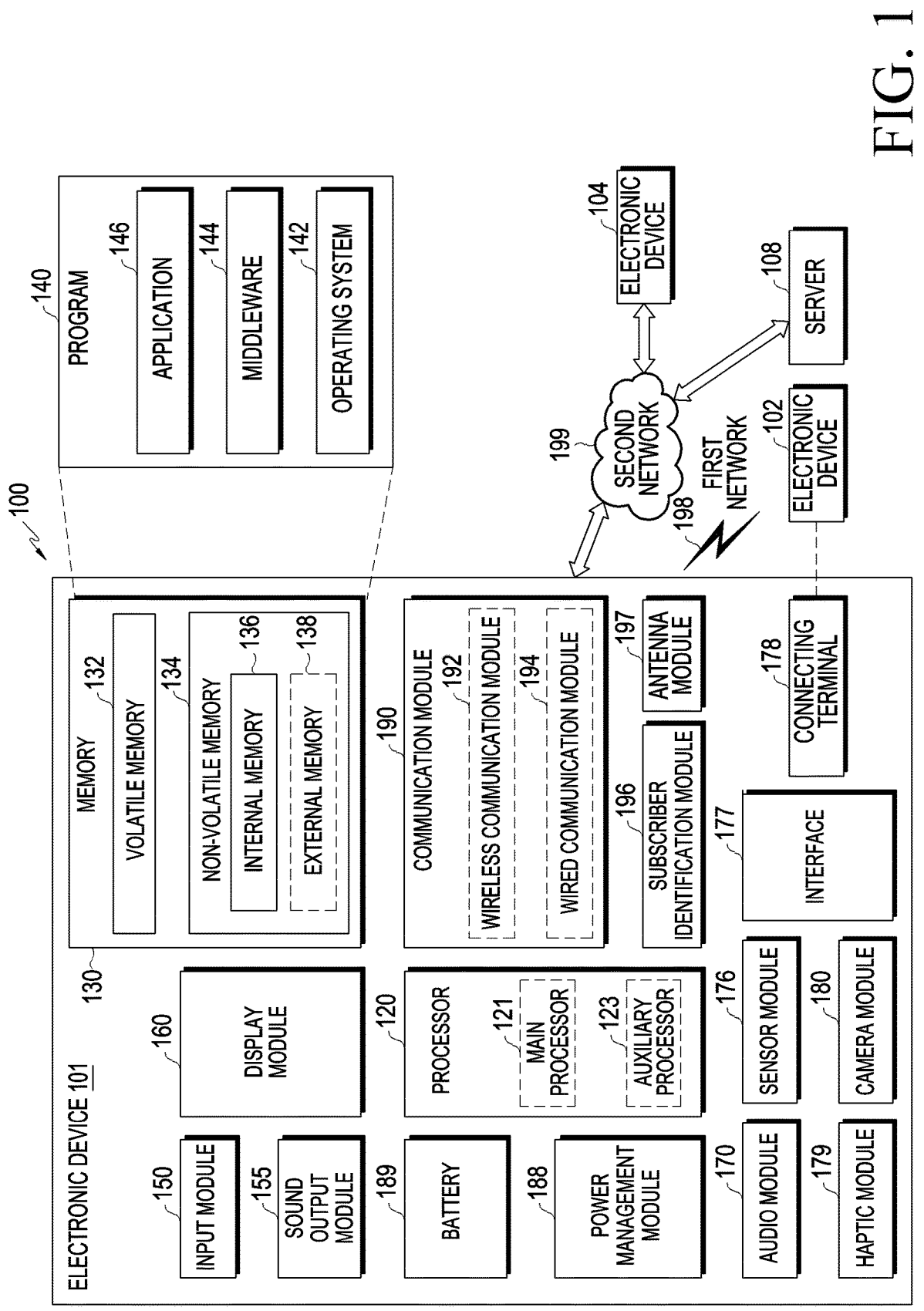
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers.

The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the strength of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form an mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

An example of electronic devices according to embodiments of the disclosure will be described below.

Figure 2:
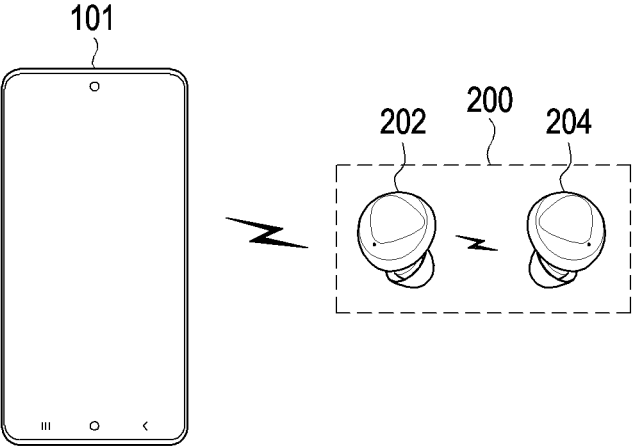
FIG. 2 is a diagram illustrating connection between a user terminal and a binaural wireless audio device according to an embodiment of the disclosure.

FIG. 2 is a diagram illustrating connection between a user terminal and a binaural wireless audio device 200 according to an embodiment of the disclosure.

Referring to FIG. 2, the user terminal (e.g., the electronic device 101) may be wirelessly connected to the binaural wireless audio device 200. Although the user terminal (e.g., the electronic device 101) may include a smartphone as illustrated in FIG. 2, the user terminal may also be implemented as various types of devices (e.g., a notebook computer including a standard notebook, an ultrabook, a netbook, and a tapbook, a laptop computer, a tablet computer, and a desktop computer), without being limited to the description and/or the illustration. The user terminal (e.g., the electronic device 101) may be implemented as described above with reference to FIG. 1, and accordingly include the components (e.g., various modules) illustrated in FIG. 1. Therefore, a redundant description will be avoided.

The binaural wireless audio device 200 may include a pair of devices (e.g., a first earbud 202 and a second earbud 204). According to an embodiment of the disclosure, the pair of devices (e.g., the first earbud 202 and the second earbud 204) may be implemented to include the same or similar components (e.g., components described with reference to FIG. 3).

The user terminal (e.g., the electronic device 101) and the binaural wireless audio device 200 may establish a communication connection with each other and transmit data to and/or receive data from each other. For example, the user terminal (e.g., the electronic device 101) may establish a communication connection with at least one of the first earbud 202 or the second earbud 204 using Bluetooth (e.g., Bluetooth classic and/or BLE) (e.g., using a communication circuit (e.g., the wireless communication module 192) supporting the communication scheme) to establish a communication connection with each other, to which the disclosure is not limited. Rather, the user terminal may use various types of communication (e.g., a communication scheme, such as Wi-Fi using an access point (AP), a cellular communication scheme using a base station, or a wired communication scheme).

In an embodiment of the disclosure, when the binaural wireless audio device 200 includes a pair of devices (e.g., the first earbud 202 and the second earbud 204), the user terminal (e.g., electronic device 101) may establish a communication connection with only one (e.g., a primary earbud) of the pair of devices (e.g., the first earbud 202 and the second earbud 204). However, without being limited to the description, the user terminal may establish communication connections with both of the pair of devices (e.g., the first earbud 202 and the second earbud 204).

The pair of audio devices (e.g., the first earbud 202 and the second earbud 204) included in the binaural wireless audio device 200 may establish a communication connection with each other and transmit and/or receive data (e.g., audio data and/or control data) to and/or from each other. The communication connection may be established using, but is not limited to, device to device (D2D) communication, such as Wi-Fi direct or Bluetooth (e.g., using a communication circuit supporting the communication (e.g., a communication circuit 320 in FIG. 3)), as described above.

In an embodiment of the disclosure, one of the pair of devices (e.g., the first earbud 202 and the second earbud 202) may be a primary device (or a main device), the other device may be a secondary device (or a sub-device), and the primary device may transmit data to the secondary device. For example, when the pair of devices (e.g., the first earbud 202 and the second earbud 204) establish a communication connection with each other, one of the pair of devices (e.g., the first earbud 202 and the second earbud 204) may be randomly selected as the primary device, and the other device may be selected as the secondary device.

For example, when the pair of devices (e.g., the first earbud 202 and second earbud 204) establish a communication connection with each other, a device which is detected as first worn (e.g., a value indicating wearing is detected using a sensor (e.g., a proximity sensor, a touch sensor, a tilt 6-axis sensor, or a 9-axis sensor) for detecting wearing) may be selected as the primary device, and the other device may be selected as the secondary device. In an embodiment of the disclosure, the primary device may transmit data received from the user terminal (e.g., the electronic device 101) to the secondary device or transmit data (e.g., control data or audio data) to the user terminal. For example, the first earbud 202 serving as the primary device may output an audio to a speaker based on audio data received from the user terminal (e.g., the electronic device 101), and transmit the audio data to the second earbud 204 serving as the secondary device, as well. In an embodiment of the disclosure, the secondary device may receive audio data transmitted from the user terminal (e.g., the electronic device 101) to the primary device by sniffing, based on connection information provided by the primary device.

In an embodiment of the disclosure, the first earbud 202 serving as the primary device may transmit data (e.g., audio data or control data) received from the second earbud 204 serving as the secondary device to the user terminal (e.g., the electronic device 101). For example, when a touch event occurs on the second earbud 204 serving as the secondary device, control data including information about the occurred touch event may be transmitted to the user terminal (e.g., the electronic device 101) by the first earbud 202 serving as the master device. For example, the first earbud 202 serving as the primary device may transmit audio data provided by the second earbud 204 serving as the secondary device to the user terminal (e.g., the electronic device 101).

In an embodiment of the disclosure, the first earbud 202 may exchange audio data and/or control data with the user terminal (e.g., the electronic device 101) based on audio over BLE (AoBLE), and the second earbud 204 may exchange audio data and/or control data with the user terminal (e.g., the electronic device 101) based on AoBLE.

However, without being limited to the foregoing description, the first earbud 202 and the second earbud 204 may communicate with the user terminal (e.g., the electronic device 101) by at least one of sniffing, relaying, or AoBLE.

Figure 3:
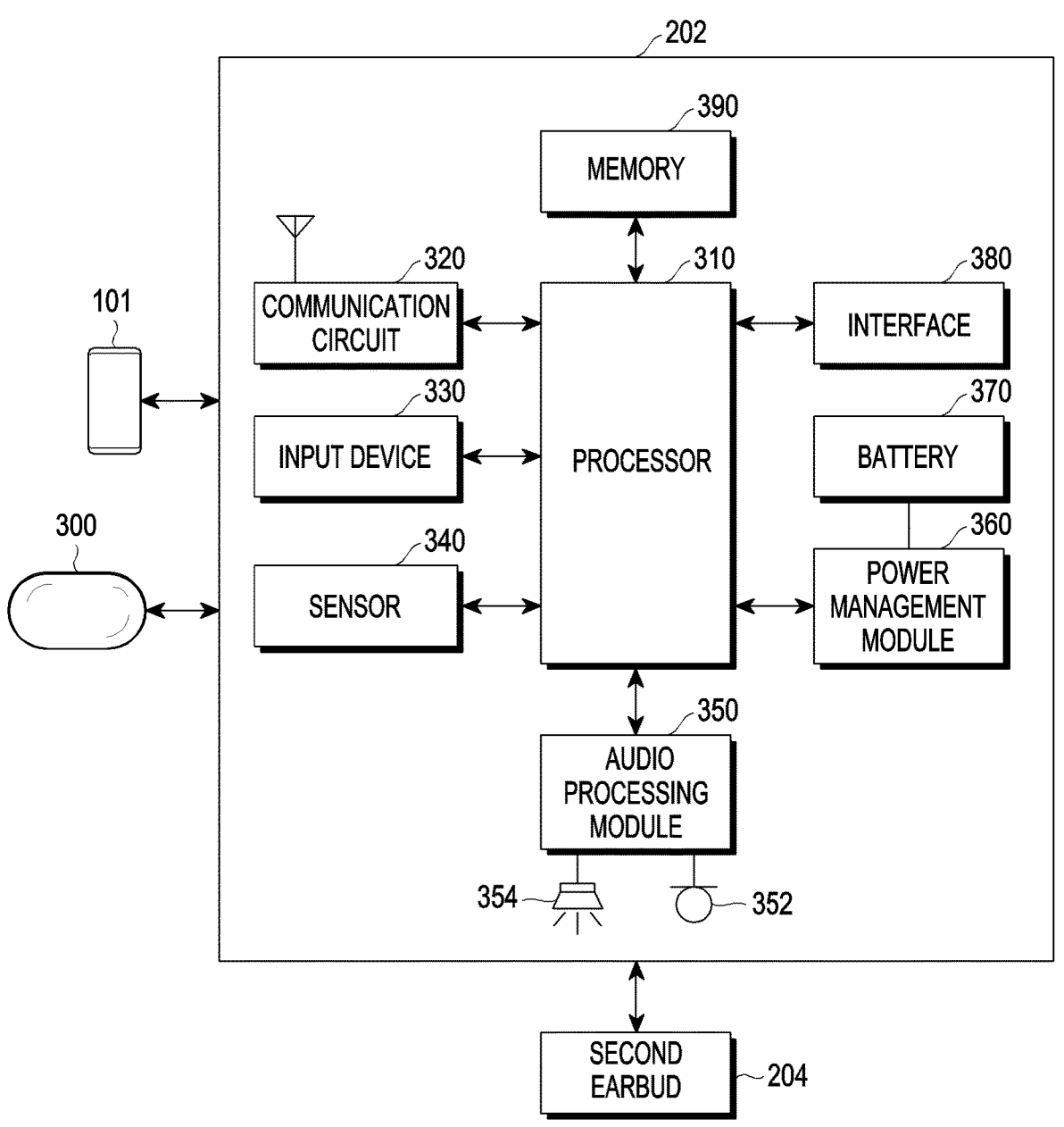
FIG. 3 is a block diagram illustrating a configuration of a first earbud according to an embodiment of the disclosure.

FIG. 3 is a block diagram illustrating a configuration of a first earbud according to an embodiment of the disclosure.

In an embodiment of the disclosure, the first earbud 202 may be a primary earbud connectable to the electronic device 101 (e.g., a smartphone) illustrated in FIG. 1, and the second earbud 204 may be a secondary earbud connectable to the primary earbud and/or the electronic device 101 (e.g., a smartphone).

Referring to FIG. 3, the first earbud 202 may include a component identical or similar to at least one of the components (e.g., modules) of the electronic device 101 illustrated in FIG. 1. The first earbud 202 may include the communication circuit 320 (e.g., the communication module 190 in FIG. 1), an input device 330 (e.g., the input module 150 in FIG. 1), a sensor 340 (e.g., the sensor module 176 in FIG. 1), an audio processing module 350 (e.g., the audio module 170 in FIG. 1), memory 390 (e.g., the memory 130 in FIG. 1), a power management module 360 (e.g., the power management module 188 in FIG. 1), a battery 370 (e.g., the battery 189 in FIG. 1), an interface 380 (e.g., the interface 177 in FIG. 1), and a processor 310 (e.g., the processor 120 in FIG. 1).

The communication circuit 320 may include at least one of a wireless communication module (e.g., a Bluetooth communication module, a cellular communication module, a wireless-fidelity (Wi-Fi) communication module, a near field communication (NFC) communication module, or a global navigation satellite system (GNSS) communication module) or a wired communication module (e.g., a local area network (LAN) communication module or a power line communication (PLC) communication module).

The communication circuit 320 may directly or indirectly communicate with at least one of the electronic device 101 (e.g., a smartphone), an electronic device 300 (e.g., a charging device, such as a cradle), or the second earbud 204 (e.g., a slave earbud) through a first network (e.g., the first network 198 in FIG. 1) using the at least one communication module included in the communication circuit 320. The second earbud 204 may be one component of the binaural wireless audio device 200, which is paired with the first earbud 202. The communication circuit 320 may operate independently of the processor 310 and include one or more communication processors supporting wired or wireless communication.

The communication circuit 320 may be connected to one or more antennas that may transmit a signal or information to an external electronic device (e.g., at least one of the electronic device 101, the electronic device 300, or the second earbud 204) or receive a signal or information from another external electronic device. According to an embodiment of the disclosure, at least one antenna suitable for a communication scheme used in a communication network, such as a first network (e.g., the first network 198 in FIG. 1) or a second network (e.g., the second network 199 in FIG. 2) may be selected from among the plurality of antennas, for example, by the communication circuit 320. A signal or information may be transmitted or received between the communication circuit 320 and another electronic device through the selected at least one antenna.

The input device 330 may be configured to generate various input signals that may be used for an operation of the first earbud 202. The input device 330 may include at least one of a touch pad, a touch panel, or a button. The touch pad may recognize a touch input, for example, in at least one of a capacitive scheme, a pressure sensitive scheme, an infrared scheme, or an ultrasonic scheme. When a capacitive touch pad is provided, it may recognize a physical contact or proximity The touch pad may further include a tactile layer. The touch pad including the tactile layer may provide a tactile response to a user. The button may include, for example, a physical button or an optical key.

The input device 330 may generate a user input related to on or off of the first earbud 202. According to an embodiment of the disclosure, the input device 330 may receive a user input to establish a communication connection between the first earbud 202 and the second earbud 204. According to an embodiment of the disclosure, the input device 330 may receive a user input related to audio data (or audio content). For example, the user input may be related to a function of play start, play pause, play stop, play speed control, play volume control, or mute for the audio data. The operation of the first earbud 202 may be controlled by various gestures, such as tapping a surface on which the touch pad is installed or swiping up and down on the surface. According to an embodiment of the disclosure, the input device 330 may receive a user input to initiate pairing between the first earbud 202 and/or the second earbud 204 and the electronic device 101.

The sensor 340 may identify the location or operational state of the first earbud 202. The sensor 340 may convert measured or identified information into an electrical signal. The sensor 340 may include, for example, at least one of a magnetic sensor, an accelerometer sensor, a gyro sensor, a geomagnetic sensor, a proximity sensor, a gesture sensor, a grip sensor, or a biometric sensor. In an embodiment of the disclosure, the sensor 340 may further include an optical sensor. The optical sensor may include a light emitting element (e.g., a light emitting diode (LED)) that outputs light in at least one wavelength band. The optical sensor may include a light receiver (e.g., a photodiode) that receives light of one or more wavelength bands scattered or reflected from an object and thus generates an electrical signal.

The audio processing module 350 may support an audio data collection function and play collected audio data. According to an embodiment of the disclosure, the audio processing module 350 may include an audio decoder (not shown) and a D/A converter (not shown). The audio decoder may convert audio data stored in the memory 390 or received from the electronic device 101 through the communication circuit 320 into a digital audio signal. The D/A converter may convert the digital audio signal converted by the audio decoder into an analog audio signal. The audio decoder may convert audio data received from the electronic device 101 through the communication circuit 320 and stored in the memory 390 into a digital audio signal. A speaker 354 may output the analog audio signal converted by the D/A converter. The audio processing module 350 may include an A/D converter (not shown). The A/D converter may convert an analog audio signal input through a microphone 352 (hereinafter, referred to as a mic) into a digital audio signal.

The audio processing module 350 may play various configured audio data in operating the first earbud 202. For example, the processor 310 may be designed to detect through the sensor 340 that the first earbud 202 has been coupled to or removed from the user's ear, and play audio data of a sound effect or audio data of a notification sound through the audio processing module 350. The output of the sound effect or the notification sound may be omitted based on user preference or designer intent.

The memory 390 may store various data used by at least one component (e.g., the processor 310 or the sensor 340) of the first earbud 202. The data may include, for example, input data or output data for software and commands related to the software. According to an embodiment of the disclosure, the data may include audio data received from the electronic device 101, information about a cover state (e.g., open or closed) of the electronic device 300, information about a location of the second earbud 204 received from the electronic device 300 or the second earbud 204, or information about a role and at least one parameter required for connection to the second earbud 204. The memory 390 may include volatile memory or non-volatile memory.

The power management module 360 may manage power supplied to the first earbud 202. According to an embodiment of the disclosure, the power management module 360 may be implemented as at least a portion of a power management integrated circuit (PMIC), for example. According to an embodiment of the disclosure, the power management module 360 may include a battery charging module. According to an embodiment of the disclosure, when an external electronic device (e.g., one of the electronic device 101, the electronic device 300, the second earbud 204, or another electronic device) is electrically coupled (wirelessly or wiredly) to the first earbud 202, the power management module 360 may receive power from the external electronic device and charge the battery 370.

The battery 370 may supply power to at least one component of the first earbud 202. According to an embodiment of the disclosure, the battery 370 may include, for example, a rechargeable battery. According to an embodiment of the disclosure, when the first earbud 202 is mounted within the electronic device 300, the first earbud 202 may charge the battery 370 to a predetermined charge level and then be turned on or turn on at least a portion of the communication circuit 310.

The interface 380 may support one or more specified protocols that may be used for direct (e.g., wired) connection between the first earbud 202 and the electronic device 101, the electronic device 30, the second earbud 204, or an external electronic device (not shown). According to an embodiment of the disclosure, the interface 380 may include, for example, at least one of a HDMI, a USB interface, an SD card interface, a PLC interface, or an audio interface. According to an embodiment of the disclosure, the interface 380 may include at least one connection port to establish a physical connection with the electronic device 300.

The processor 310 may control at least one other component (e.g., hardware or software component) connected to the processor 310, for example, by executing software and performing various data processing or computations. According to an embodiment of the disclosure, as at least part of data processing or a computation, the processor 310 may load instructions or data received from another component (e.g., the sensor 340 or the communication circuit 320) into the volatile memory 390, process the instructions or data stored in the volatile memory 390, and store the resulting data in non-volatile memory.

According to an embodiment of the disclosure, the processor 310 may identify whether an electrical connection has been established between the first earbud 202 and the electronic device 300 through the sensor 340 or the interface 380. The processor 310 may receive information about a location of the second earbud 204 from the electronic device 300 through an electrical connection established between the first earbud 202 and the electronic device 300.

According to an embodiment of the disclosure, the processor 310 may identify whether the cover of the electronic device 300 is in an open or closed state by recognizing a magnetic object installed on the electronic device 300 through a magnetic sensor included in the sensor 340.

According to an embodiment of the disclosure, the processor 310 may identify that an electrical connection has been established between the first earbud 202 and the electronic device 300 by recognizing that a connection port included in the interface 380 has contacted at least one electrical contact point of the electronic device 300.

According to an embodiment of the disclosure, the processor 310 may establish a communication connection with the electronic device 101 through the communication circuit 320 and receive data (e.g., audio data or control data) from the electronic device 101 through the established communication connection. According to an embodiment of the disclosure, the processor 310 may transmit the data received from the electronic device 101 to the second earbud 204 through the communication circuit 320.

According to an embodiment of the disclosure, the processor 310 may perform operations of the first earbud 202 which will be described below.

The first earbud 202 may further include various modules depending on a form in which it is provided. Along with the trend toward convergence of digital devices, variations are so numerous that it is not possible to enumerate them all. However, components equivalent to those mentioned above may be further included in the first earbud 202. Obviously, a certain component may be excluded from or other components may be added to the above-mentioned components in the first earbud 202 according to an embodiment depending on the form in which the first earbud 202 is provided. This will be readily apparent to those skilled in the art.

The second earbud 204 paired with the first earbud 202 may include the same components as or similar components to those of the first earbud 202 and perform all or some of the operations of the second earbud 204 described below with reference to the drawings. In an embodiment of the disclosure, the second earbud 204 may include its own microphone (which may be the same as the microphone 352, for example) to support binaural recording.

Figure 4A:
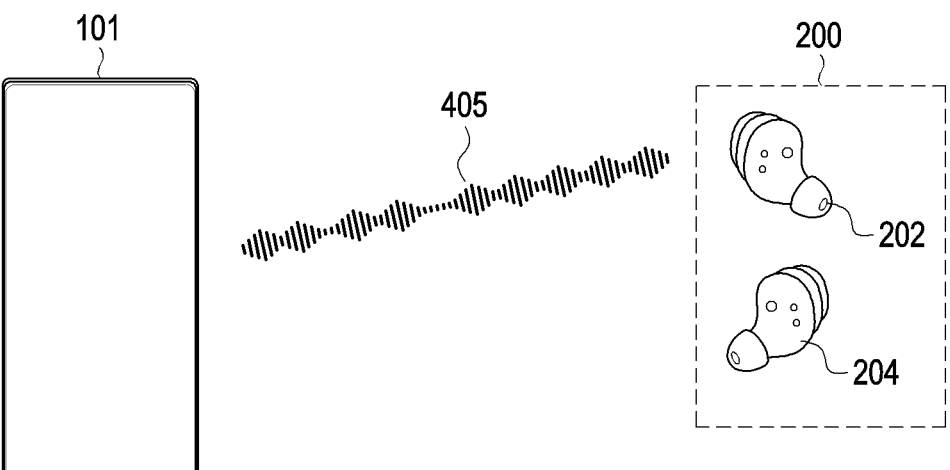
FIGS. 4A and 4B are diagrams illustrating connection between an electronic device and a binaural wireless audio device according to various embodiments of the disclosure.
Figure 4B:
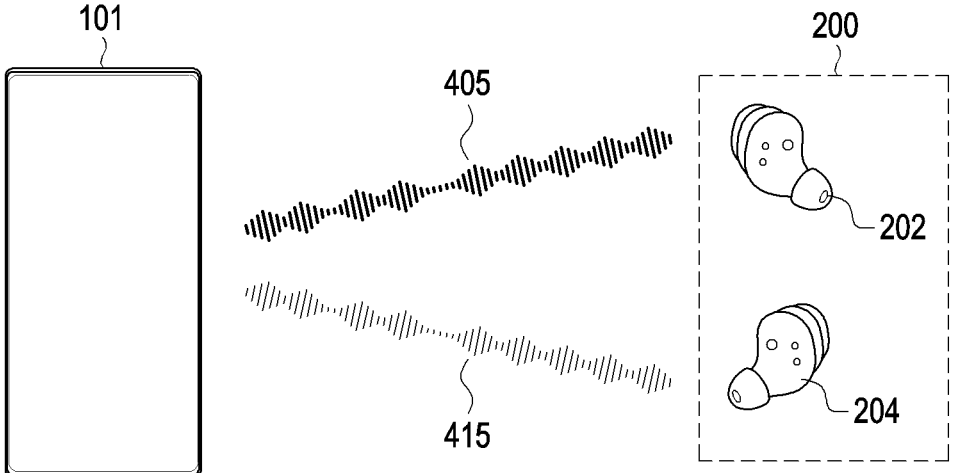

FIGS. 4A and 4B are diagrams illustrating connection between an electronic device and a binaural wireless audio device according to various embodiments of the disclosure.

Referring to FIG. 4A, in order to make an audio recording using the binaural wireless audio device 200 during video recording in the electronic device 101, a Bluetooth-based communication link 405 may be used between the electronic device 101 and the binaural wireless audio device 200.

In an embodiment of the disclosure, the first earbud 202 set as a primary earbud out of the first earbud 202 and the second earbud 204 may transmit audio data input through its microphone (e.g., the microphone 352) to the electronic device 101 through the communication link 405. Therefore, when the electronic device 101 performs audio recording through the first earbud 202, audio data in a monaural format may be input to the electronic device 101.

Referring to FIG. 4B, the binaural wireless audio device 200 may include the first earbud 202 and the second earbud 204 that support Bluetooth classic (e.g., Bluetooth basic rate (BR)/enhanced data rate (EDR)) and/or BLE, and the electronic device 101 may be connected to the binaural wireless audio device 200 using binaural recording technology. To support the binaural recording technology, each of the first earbud 202 and the second earbud 204 may include a microphone (e.g., the microphone 352).

Instead of establishing a Bluetooth-based SCO link (e.g., the communication link 405) with a single earbud (e.g., the first earbud 202 or the second earbud 204) to transmit audio data between the electronic device 101 and the binaural wireless audio device 200, the binaural recording technology may establish bidirectional communication links 410 and 415 between the electronic device 101 and the first and second earbuds 202 and 204.

In an embodiment of the disclosure, each of a first communication link and a second communication link 415 may be an LE link based on Bluetooth LE audio technology. The LE audio technology may support a low complexity communications codec (LC3), which is a higher quality and lower power audio codec compared to classic audio technology using SCO, and support multi-stream audio transmission between the electronic device 101 and the binaural wireless audio device 200. The electronic device 101 may receive audio data from the first earbud 202 through the first communication link 410 and audio data from the second earbud 204 through the second communication link 415.

Figure 5:
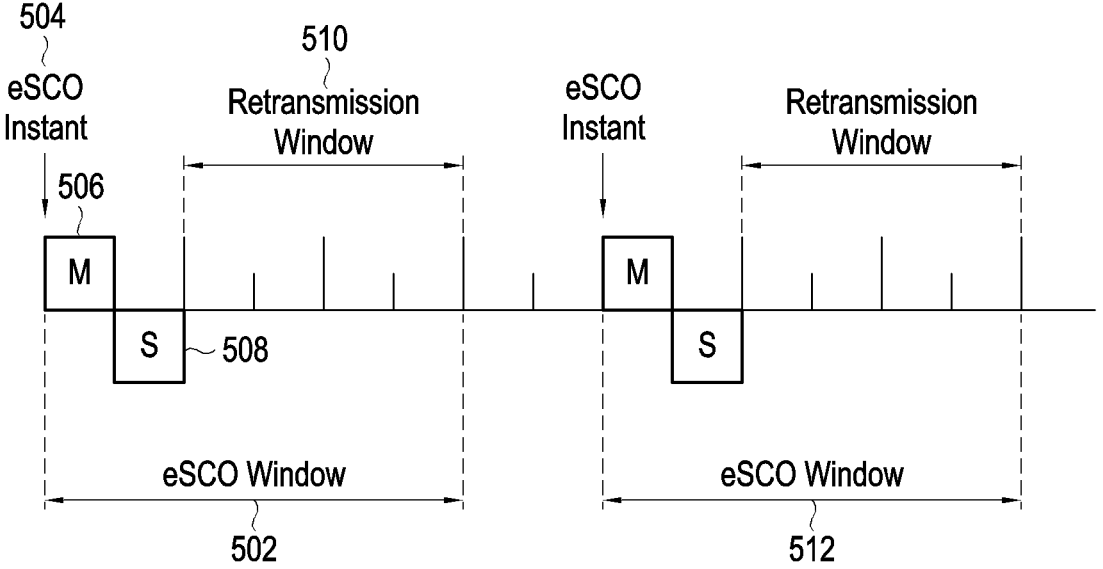
FIG. 5 is a diagram illustrating audio transmission and reception through a Bluetooth eSCO link according to an embodiment of the disclosure.

FIG. 5 is a diagram illustrating audio transmission and reception through a Bluetooth eSCO link according to an embodiment of the disclosure.

Referring to FIG. 5, the electronic device 101 may connect an eSCO link (e.g., the communication link 405) with one of the first earbud 202 and the second earbud 204 included in the binaural wireless audio device 200, for example, with the first earbud 202 and communicate audio data in both directions through the eSCO link. The electronic device 101 may be synchronized to an eSCO instant 504 based on a Bluetooth clock and perform an operation of transmitting or receiving audio data in allocated slots 506 and 508 with a given periodicity. Similarly, the first earbud 202 may be synchronized to the eSCO instant 504 and transmit or receive audio data in the allocated slots 506 and 508 with the given periodicity.

In an embodiment of the disclosure, an eSCO window 502 starting at the eSCO instant 504 may include a plurality of (e.g., 6) time slots, and an SCO link between the electronic device 101 and the first earbud 101 may include at least some of the plurality of time slots. In an embodiment of the disclosure, a first timeslot 506 may be allocated for transmission from the electronic device 101 and a second timeslot 508 of the eSCO window 502 may be allocated for transmission from the first earbud 101. The electronic device 101 may transmit audio data in the first time slot 506, and the first earbud 202 may receive the audio data and output the audio data through the speaker (e.g., the speaker 354). The first earbud 202 may transmit audio data obtained through the microphone (e.g., the microphone 352) of the first earbud 202 in the second time slot 508, and the electronic device 101 may receive the audio data and store or play the audio data.

In an embodiment of the disclosure, one or more time slots within the eSCO window 502 may be allocated for a retransmission window 510. At least one of time slots within the retransmission window 510 may be used for retransmission of audio data that the electronic device 101 or the first earbud 202 has failed to transmit. Likewise, the electronic device 101 and the first earbud 202 may also perform the operation of transmitting and receiving audio data in a next eSCO window 512.

In an embodiment of the disclosure, a packet including audio data (hereinafter, referred to as an audio data packet) transmitted in an allocated slot (e.g., the slot 506 or the slot 508) within the eSCO window 502 may be retransmitted in one of the slots within the retransmission window 510 in the following cases.

A NAK response is received from the other device.

No response is received from the other device.

The retransmission of the audio data packet may only be performed within the eSCO window 502, not after the end of the eSCO window 502.

In an embodiment of the disclosure, the communication link between the electronic device 101 and the first earbud 202 may be classified as an SCO link or an eSCO link depending on the type of a packet used for transmission of audio data, and the electronic device 101 and the first earbud 202 may determine the type of a packet to be used depending on whether each packet type is supported and through negotiation.

FIG. 6 is a diagram illustrating types of Bluetooth packets according to an embodiment of the disclosure.

Referring to FIG. 6, packet types 602 available for an SCO link may include high quality voice 1 (HV1), HV2, HV3, and data-voice (DV). Packet types 604 available for an eSCO link may include eSCO voice 3 (EV3), EV4, EV5, 2-EV3, 2-EV5, 3-EV3, and 3-EV5. Each of the packet types may be identified by the size of a payload header, the size of a user payload, whether forward error correction (FEC) is supported, whether message integrity check (MIC) is supported, whether cyclic redundancy check (CRC) is supported, and a symmetric max. rate.

In an embodiment of the disclosure, audio data encoded using a specific codec may be transmitted between the electronic device 101 and the first earbud 202 through an SCO link (e.g., the communication link 405), and the codec may be, for example, a continuous variable slope delta (CVSD) or modified sub band codec (mSBC). A CVSD codec, which is a mandatory support for a device using Bluetooth SCO, may support mono streams and a sampling rate of 8 kilohertz (KHz). An mSBC codec may provide a higher quality audio than the CVSD codec, and provide richer audio quality using a sampling rate of 16 KHz, although supporting mono streams like the CVSD codec.

In an embodiment of the disclosure, each of the first communication link 410 and the second communication link 415 for multi-stream audio transmission between the electronic device 101 and the binaural wireless audio device 200 as illustrated in FIG. 4B may support a single packet format available for both an advertising channel packet and a data channel packet according to the Bluetooth LE technology. In an embodiment of the disclosure, the packet format based on the Bluetooth LE technology may include a preamble of 1 byte, an access address of 4 bytes, a protocol data unit (PDU) of 2 to 257 bytes, and a CRC of 3 bytes, and the PDU may be, for example, a data channel PDU including audio data in payload.

Figure 7:
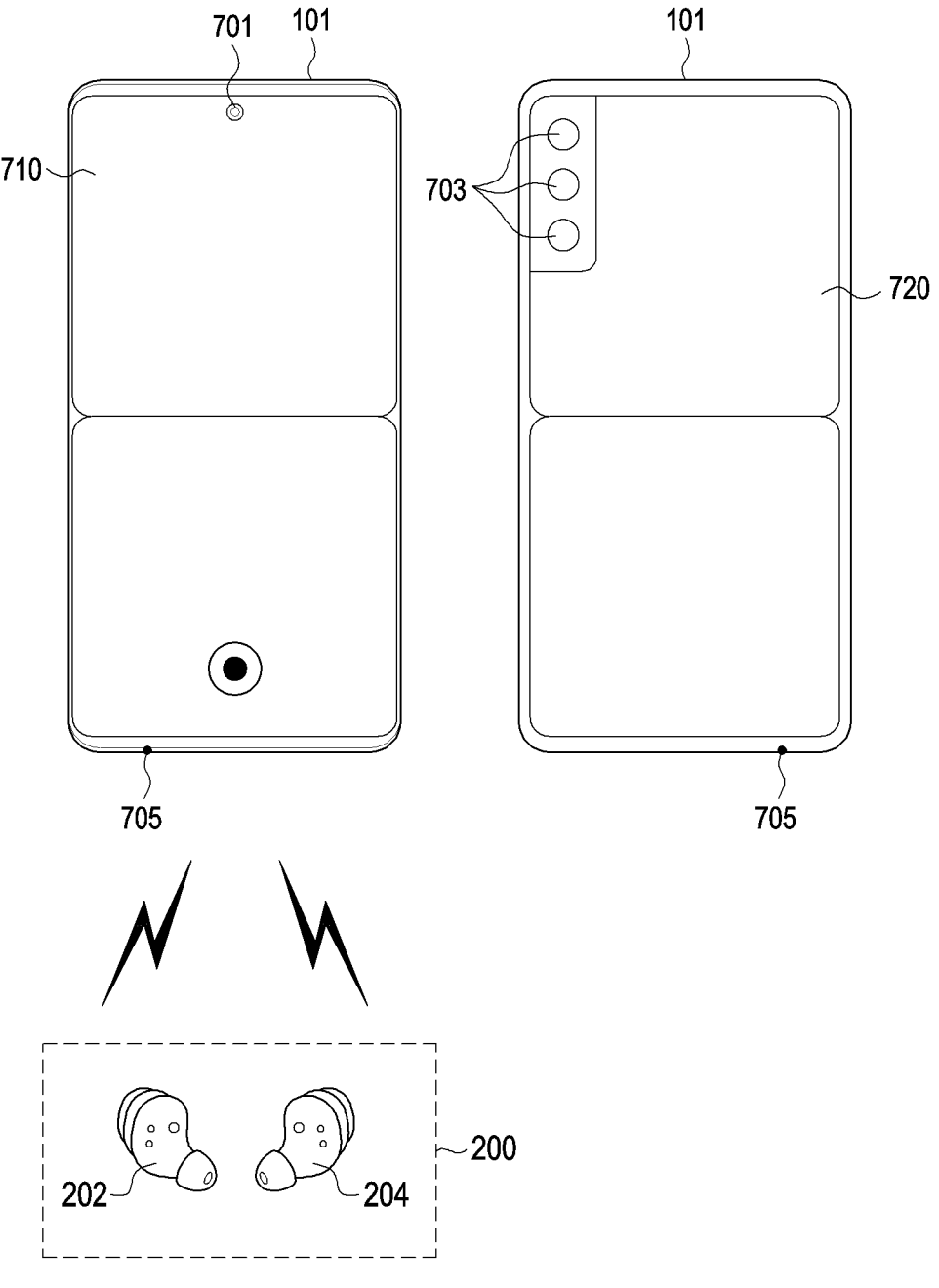
FIG. 7 is a diagram illustrating configurations of a front camera and a rear camera in an electronic device according to an embodiment of the disclosure.

FIG. 7 is a diagram illustrating a configuration of a front camera and a rear camera in an electronic device according to an embodiment of the disclosure.

Referring to FIG. 7, the electronic device 101 may include a display module (e.g., the display module 160 in FIG. 1) visually exposed to the outside on a first surface (e.g., a front surface) 710 of a housing, at least one first camera 701 (hereinafter, referred to as a front camera) disposed on a portion of the first surface 710, and at least one second camera 703 (hereinafter, referred to as a rear camera) disposed on a second surface (e.g., a rear surface) 720.

In an embodiment of the disclosure, the first camera 701 may be a camera disposed to face in the same direction as a main display (e.g., the display module 160 in FIG. 1) of the electronic device 101, whereas the second camera 703 may be a camera disposed to face in the same direction as a sub-display (e.g., an external display module of a flippable or foldable electronic device), or vice versa. In an embodiment of the disclosure, the electronic device 101 may be a foldable device with a main display (e.g., the display module 160 in FIG. 1) including at least two display modules in a row, the first camera 701 may be disposed to face in the same direction as one display module of the main display, and the second camera 702 may be disposed to face in the same direction as the other display module of the main display.

The electronic device 101 may include a microphone 705 disposed on a third surface (e.g., a bottom surface) of the housing. In an embodiment of the disclosure, the microphone 705 may include one or more microphone elements. For example, the microphone 705 may include three microphone elements capable of receiving three channels of audio data, respectively, such as an omnidirectional (OMNI) microphone, a front microphone, and a rear microphone. According to an embodiment of the disclosure, the processor 120 of the electronic device 101 may be electrically coupled to the memory 130, the display module 160, the camera module 180, and the microphone 705.

When an application for capturing an image (e.g., a camera application) is executed, the processor 120 of the electronic device 101 according to an embodiment may control to drive at least one of the front camera 701 or the rear camera 703. For example, when the processor 120 receives an input based on an execution icon (e.g., an object, a graphical element, a menu, a button, or a shortcut image) (not shown) representing the camera application, displayed on a home screen of the display module 160 (not shown), a specified button input, or a specified gesture input, the processor 120 may identify that video recording has been requested, and execute the camera application.

According to the execution of the camera application, the processor 120 of the electronic device 101 according to an embodiment may activate the at least one camera 701 and 703 to execute the video recording, and control the display module 160 to display at least one captured image. When multiple camera recording is required according to a user input, the electronic device 101 may activate both the front camera 701 and the rear camera 703 to simultaneously receive a first image from the front camera 701 and a second image from the rear camera 703, and control the display module 160 to simultaneously display the first image and the second image.

In an embodiment of the disclosure, the processor 120 may activate at least one microphone (e.g., the microphone 705) included in the input module 150 to receive an audio signal corresponding to a sound coming from the user, a subject, or the surroundings of the subject during the video recording.

In an embodiment of the disclosure, the processor 120 may establish a communication connection (e.g., the communication link 405 or the communication links 410 and 415) with at least one external electronic device (e.g., the binaural wireless audio device 200) and instruct to activate a microphone (e.g., the microphone 352) of the binaural wireless audio device 200 through the communication connection, through the wireless communication module 192. In an embodiment of the disclosure, the processor 120 may directly control the wireless communication module 192 to activate the microphone (e.g., microphone 352) of the binaural wireless audio device 200, or may control the wireless communication module 192 through the audio module 170 to activate the microphone (e.g., the microphone 352) of the binaural wireless audio device 200. In an embodiment of the disclosure, the electronic device 100 may be connected to an external wired microphone (e.g., a USB microphone) (not shown) that communicates with the processor 120 through the connecting terminal 178, and the processor 120 may activate the wired microphone through the connecting terminal 178 or instruct the audio module 170 to activate the wired microphone through the connecting terminal 178, and receive audio data through the wired microphone.

In an embodiment of the disclosure, audio data collected by at least one of the microphone 705 or the binaural wireless audio device 200 (or the wired microphone) may be transmitted to the processor 120 through the audio module 170, and the processor 120 may synchronize and combine the audio data with an image collected through the front camera 701 and/or the rear camera 703.

Figure 8A:
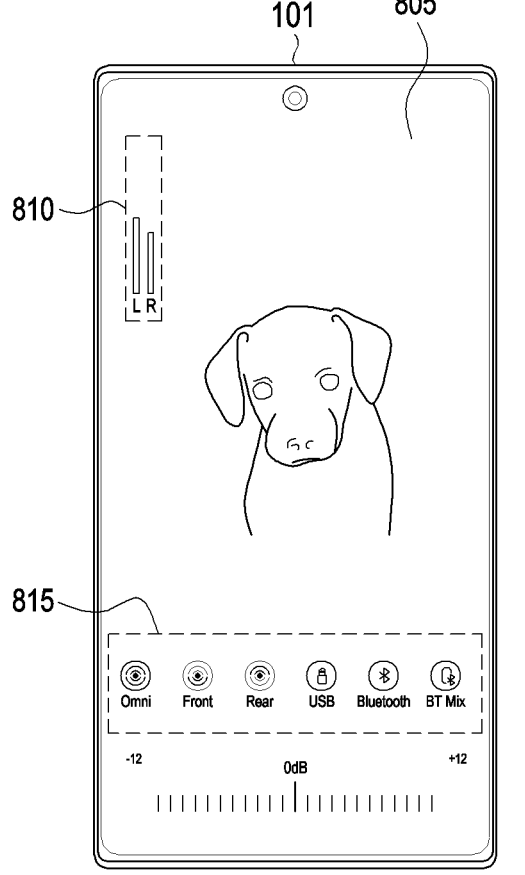
FIGS. 8A and 8B are diagrams illustrating an audio input selection screen according to various embodiments of the disclosure.
Figure 8B:
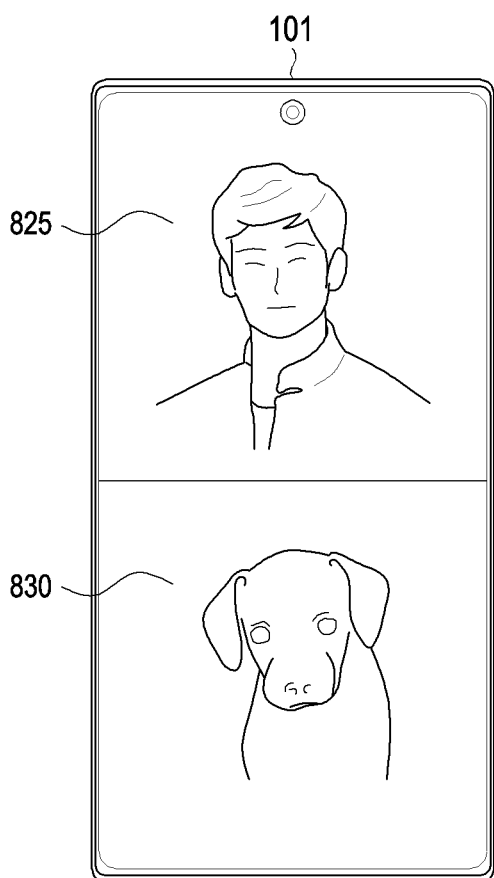

FIGS. 8A and 8B are diagrams illustrating audio input selection screens according to various embodiments of the disclosure.

Referring to FIG. 8A, the electronic device 101 may execute the camera application, and display an image 805 obtained through one (e.g., the rear camera 703) of a plurality of cameras (e.g., the front camera 701 and the rear camera 703) during video recording. In an embodiment of the disclosure, the image 805 may be displayed in all or substantially all of a display area formed by the display module 160 of the electronic device 101. While the image 805 obtained through the rear camera 703 is being displayed, the electronic device 101 may receive an audio through its microphone 705 and display information 810 indicating a state (e.g., a left volume and a right volume) of the received audio along with the image 805.

In an embodiment of the disclosure, the electronic device 101 may display, along with the image 805, a selection screen 815 for selecting one of a plurality of audio inputs. In an embodiment of the disclosure, the selection screen 815 may guide a user input to select at least one of at least one microphone included in the electronic device 101 or at least one external electronic device with a microphone.

In an embodiment of the disclosure, the selection screen 815 may include image symbols corresponding to one or more of an omnidirectional (omni) microphone, a front microphone, a rear microphone, a USB microphone, at least one Bluetooth device (e.g., the binaural wireless audio device 200), and a Bluetooth composite (mix). In an embodiment of the disclosure, an image symbol corresponding to an external electronic device included in or connected to the electronic device 101 may be activated, whereas an image symbol corresponding to an external electronic device that is not connected to the electronic device 101 may be deactivated. In an embodiment of the disclosure, the selection screen 815 may include an image symbol representing at least one Bluetooth device connected to the electronic device 101 or an image symbol representing at least one Bluetooth device that has ever been connected to the electronic device 101. In an embodiment of the disclosure, the omnidirectional microphone, the front microphone, and the rear microphone may be included in the microphone 705 of the electronic device 101. For example, Bluetooth mixing may mean simultaneously receiving audio data from the microphone 705 of the electronic device 101 and audio data from a Bluetooth device (e.g., the binaural wireless audio device 200).

During the video recording, the electronic device 101 may receive audio data through an audio input selected on the selection screen 815. In an embodiment of the disclosure, when one audio input, such as a Bluetooth device (e.g., the binaural wireless audio device 200), is selected on the selection screen 815, the electronic device 101 may receive audio data from the selected Bluetooth device, and mix and store the audio data with the current captured image 805.

Referring to FIG. 8B, the electronic device 101 may execute the camera application in a multiple camera recording mode, perform video recording using a plurality of cameras (e.g., the front camera 701 and the rear camera 703) simultaneously, and display a first image 825 obtained from the first camera (e.g., the front camera 701) and a second image 830 obtained from the second camera (e.g., the rear camera 703) at the same time. In an embodiment of the disclosure, the first image 825 and the second image 830 may not overlap each other, for example, the first image 825 may be disposed in an upper portion of the display area formed by the display module 160 of the electronic device 101, while the second image 830 may be disposed in a lower portion of the display area. In an embodiment of the disclosure, the second image 830 may be output in all (or substantially all) of the display area, and the first image 825 may be output in a small screen area that obscures a portion (e.g., a lower right portion) of the second image 830.

In an embodiment of the disclosure, in the multiple camera recording mode, the electronic device 101 may receive audio data through the microphone 705 of the electronic device 101, and store or play the audio data along with each of the first image 825 and the second image 830. The audio data received through the microphone 705 of the electronic device 101 may include a sound introduced at a greater volume from a sound source closer to the electronic device 101. For example, while the front camera 701 captures an interviewer and the rear camera 703 captures an interviewee, the microphone 705 of the electronic device 101 may receive the interviewer's voice at a greater volume. Therefore, storing the first image 825 from the front camera 701 and the second image 830 from the rear camera 703 together with the audio data from the microphone 705 in this manner may result in imbalance in the voice loudness of multiple speakers.

According to an embodiment of the disclosure, in the course of simultaneous recording (i.e., multiple camera recording) using the front camera 701 and the rear camera 703 of the electronic device 101, the electronic device 101 may receive a plurality of audio data obtained from an external electronic device having a plurality of microphones (e.g., the binaural wireless audio device 200) using the binaural recording technology, and combine the audio data with an image obtained from at least one of the front camera 701 or the rear camera 703.

Figure 9A:
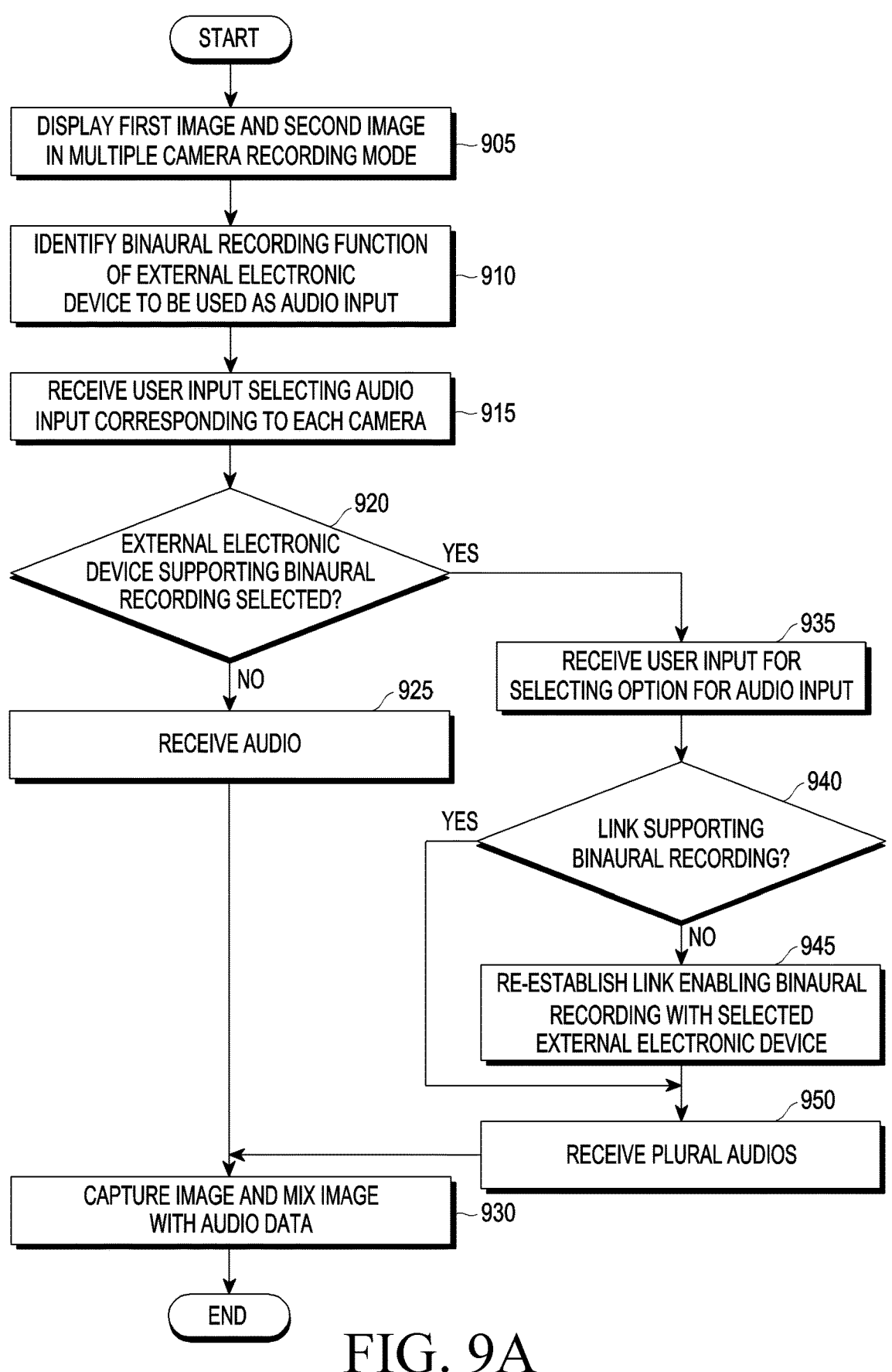
FIG. 9A is a flowchart illustrating an operation of performing binaural recording during multiple camera recording according to an embodiment of the disclosure.

FIG. 9A is a flowchart illustrating an operation of performing binaural recording during multiple camera recording according to an embodiment of the disclosure.

According to embodiments of the disclosure, at least one of the operations described below may be omitted, combined with another operation, or reordered.

Referring to FIG. 9A, in operation 905, the electronic device 101 (e.g., the processor 120 in FIG. 1) may execute the camera application in the multiple camera recording mode. In the multiple camera recording mode, the electronic device 101 may activate both the first camera (e.g., the front camera 701) and the second camera (e.g., the rear camera 703) and simultaneously output a first image (e.g., the image 825) obtained in real time from the first camera (e.g., the front camera 701) and a second image (e.g., the image 830) obtained in real time from the second camera (e.g., the rear camera 703).

In an embodiment of the disclosure, in the multiple camera recording mode, the electronic device 101 may simultaneously activate at least two (e.g., at least two cameras located on the front surface or at least two cameras located on the rear surface) of a plurality of camera elements of the front camera 701 and a plurality of camera elements of the rear camera 703, and simultaneously output at least two images obtained in real time from the at least two camera elements. In an embodiment of the disclosure, the at least two camera elements may be selected according to a user input or automatically according to a scene mode or other operational conditions.

In an embodiment of the disclosure, the processor 120 may receive a user input requesting execution of the multiple camera recording mode through a user interface (UI) of the camera application, and start the multiple camera recording mode. In an embodiment of the disclosure, the processor 120 may automatically start the multiple camera recording mode according to a given operational condition. For example, the electronic device 101 may be a foldable device, and the processor 120 may detect that the electronic device 101 is folded (e.g., a folding angle of the electronic device 101 gets less than a given threshold) during recording using any one camera (e.g., the front camera 701 or the rear camera 703) by execution of the camera application when the electronic device 101 is unfolded, and start the multiple camera recording mode to activate both the front camera 701 and the rear camera 703.

In operation 910, the electronic device 101 may identify whether at least one external electronic device (e.g., the binaural wireless audio device 200) available as an audio input in the multiple camera recording mode supports binaural recording. In an embodiment of the disclosure, the electronic device 101 may identify whether at least one external electronic device currently connected to the electronic device 101 supports binaural recording. The electronic device 101 may identify whether the external electronic device supports binaural recording based on information received from the external electronic device. In an embodiment of the disclosure, when each of the pair of earbuds 202 and 204 included in the binaural wireless audio device 200 is configured to have its own microphone, the electronic device 101 may identify that the binaural wireless audio device 200 supports binaural recording.

In an embodiment of the disclosure, the electronic device 101 may receive, from the external electronic device, information indicating whether the external electronic device supports binaural recording in the process of establishing a communication link with the external electronic device. In an embodiment of the disclosure, after establishing the communication link with the external electronic device, the electronic device 101 may transmit a signal inquiring whether the external electronic device supports binaural recording through the communication link, and receive information indicating whether the external electronic device supports binaural recording from the external electronic device through the communication link in response to the signal.

In an embodiment of the disclosure, the electronic device 101 may pre-store information indicating whether the external electronic device supports binaural recording based on information (e.g., a model name) about the external electronic device. In an embodiment of the disclosure, the electronic device 101 may receive, from a server (e.g., a manufacturer's server), information indicating whether the external electronic device supports binaural recording based on the model name of the external electronic device.

In an embodiment of the disclosure, the electronic device 101 may have prior knowledge of whether the at least one external electronic device supports binaural recording, and proceed to operation 915 or operation 935, skipping operation 910.

In operation 915, the electronic device 101 may receive a user input selecting at least one external electronic device corresponding to at least one audio input for the first image 825 and the second image 830, during the display of the first image 825 and the second image 830 in the multiple camera recording mode or prior to initiating the multiple camera recording mode.

In an embodiment of the disclosure, the electronic device 101 may display an audio input selection screen (e.g., an audio input selection screen 1010 in FIG. 10A) to select a first audio input for the first image 825 from the first camera (e.g., the front camera 701) and a second audio input for the second image 830 from the second camera (e.g., the rear camera 703), respectively, from among a plurality of audio inputs. The electronic device 101 may receive user inputs selecting the first audio input corresponding to the first camera (e.g., the front camera 701) and the second audio input corresponding to the second camera (e.g., the rear camera 703), respectively through the audio input selection screen. In an embodiment of the disclosure, the plurality of audio inputs may correspond to at least one microphone included in the electronic device 101 and at least one external electronic device with a microphone, respectively.

In an embodiment of the disclosure, the electronic device 101 may automatically detect the first audio input corresponding to the first camera and the second audio input corresponding to the second camera, and proceed to operation 940 or operation 950, skipping operation 915.

In operation 920, the electronic device 101 may determine, based on the user inputs, whether at least one external electronic device supporting binaural recording (e.g., the binaural wireless audio device 200) has been selected as the first audio input and/or the second audio input. In an embodiment of the disclosure, the electronic device 101 may determine that the binaural wireless audio device 200 has been selected as the first audio input corresponding to the first image 825 of the front camera 701 and the second audio input corresponding to the second image 830 of the rear camera 703.

In an embodiment of the disclosure, the electronic device 101 may identify that the selected external electronic device (e.g., the binaural wireless audio device 200) supports binaural recording based on the information obtained in operation 910. In an embodiment of the disclosure, the electronic device 101 may skip operation 910 and instead, in operation 915, transmit a signal to the selected external electronic device inquiring whether it supports binaural recording, and receive information indicating whether it supports binaural recording from the external electronic device.

When at least one external electronic device supporting binaural recording has not been selected as the first audio input and/or the second audio input, for example, when an external electronic device that does not support binaural recording has been selected or the microphone 705 of the electronic device 101 has been selected, the electronic device 101 may proceed to operation 925. When at least one external electronic device supporting binaural recording has been selected as the first audio input and/or the second audio input, the electronic device 101 may proceed to operation 935. For example, when the binaural wireless audio device 200 has been selected as the first audio input, and an external electronic device that does not support binaural recording or the microphone 705 of the electronic device 101 has been selected as the second audio input, the electronic device 101 may proceed to operation 935 to determine which earbud (e.g., the first earbud 202 or the second earbud 204) of the binaural wireless audio device 200 is to be connected.

In operation 925, the electronic device 101 may receive audio data from the external electronic device or the microphone 705 of the electronic device 101, which has been selected in operation 915, and proceed to operation 930. In an embodiment of the disclosure, when an external electronic device that does not support binaural recording has been selected, the electronic device 101 may receive audio data using a single communication link (e.g., the communication link 405) that has been already connected to the selected external electronic device. In an embodiment of the disclosure, the audio data may be monaural.

In operation 930, the electronic device 101 may mix the audio data with the first image 825 obtained from the front camera 701 and the second image 830 obtained from the rear camera 703 and store the mixed data. In an embodiment of the disclosure, the first image 825, the second image 830, and the audio data may be stored in a single file. In an embodiment of the disclosure, the first image and the audio data may be stored in a single file, and the second image and the audio data may be stored in another single file.

In operation 935, the electronic device 101 may provide an option selection screen (e.g., an option selection screen 1030 in FIG. 10B) corresponding to the front camera 701 or the rear camera 703 on the audio input selection screen, and receive a user input through the option selection screen to associate at least one audio device capable of binaural recording with each camera. In an embodiment of the disclosure, the at least one audio device selected in operation 935 may be either or both of a pair of audio devices (e.g., the first earbud 202 and the second earbud 204) included in the external electronic device (e.g., the binaural wireless audio device 200) selected in operation 915. In an embodiment of the disclosure, the option selection screen may include an item to select a left microphone (e.g., the first earbud 202), an item to select a right microphone (e.g., the second earbud 204), and an item to select a stereo input. Herein, the stereo input may refer to receiving audio data from both the left microphone and the right microphone.

In operation 940, the electronic device 101 may determine whether at least one communication link supporting binaural recording has already been established between the external electronic device (e.g., the binaural wireless audio device 200) selected in operation 915 and the electronic device 101. In an embodiment of the disclosure, the electronic device 101 may determine whether the LE links 410 and 415 have been established with the first earbud 202 and the second earbud 204 included in the binaural wireless audio device 200. When at least one communication link (e.g., the LE links 410 and 415) supporting binaural recording has been established, the electronic device 101 may proceed to operation 950. On the contrary, when at least one communication link (e.g., the LE links 410 and 415) supporting binaural recording has not been established, for example, when a communication link (e.g., the communication link 405) that does not support binaural recording has been established, the electronic device 101 may proceed to operation 945.

In operation 945, the electronic device 101 may release an existing established communication link (e.g., the communication link 405) from the selected external electronic device (e.g., the binaural wireless audio device 200) and re-establish at least one communication link (e.g., the LE links 410 and 415) enabling binaural recording with the selected external electronic device. In an embodiment of the disclosure, with a communication link (e.g., the SCO link 405) established between the electronic device 101 and only the first earbud 202, the first earbud 202 may be selected for the front camera 701, and the second earbud 204 may be selected for the rear camera 703. Accordingly, the electronic device 101 may release the existing established communication link (e.g., the SCO link 405) between the electronic device 101 and the first earbud 202, and establish individual communication links (e.g., the LE links 410 and 415) enabling binaural recording with the first earbud 202 and the second earbud 204.

In operation 950, the electronic device 101 may receive a plurality of audios from the selected external electronic device (e.g., the binaural wireless audio device 200) through the at least one communication link supporting binaural recording. In an embodiment of the disclosure, the electronic device 101 may receive first audio data from the first earbud 202 through the first LE link 410, and second audio data from the second earbud 204 through the second LE link 415.

In an embodiment of the disclosure, the electronic device 101 may display information (e.g., including an audio reception sensitivity) about the first audio data received from the audio device (e.g., the first earbud 202) corresponding to the first image 825, simultaneously with outputting the first image 825, and information (e.g., including an audio reception sensitivity) about the second audio data received from the audio device (e.g., the second earbud 204) corresponding to the second image 830, simultaneously with outputting the second image 830.

In operation 930, the electronic device 101 may synchronize and mix the plurality of audio data received from the selected external electronic device with the first image 825 obtained from the front camera 701 and the second image 830 obtained from the rear camera 703. The electronic device 101 may store the first image 825 and the second image 830 together with the plurality of audio data according to at least one (e.g., the flowchart of FIG. 16) of the embodiments of the disclosure.

In an embodiment of the disclosure, the first image 825, the second image 830, the first audio data received from the first earbud 202, and the second audio data received from the second earbud 204 may be stored in a single file. In an embodiment of the disclosure, the first audio data and the first image 825 may be stored in a single file, and the second audio data and the second image 830 may be stored in a single file. In an embodiment of the disclosure, the first image 825 may be stored in a single file together with the first audio data and the second audio data, and the second image 830 may be stored in a single file together with the first audio data and the second audio data.

Figure 9B:
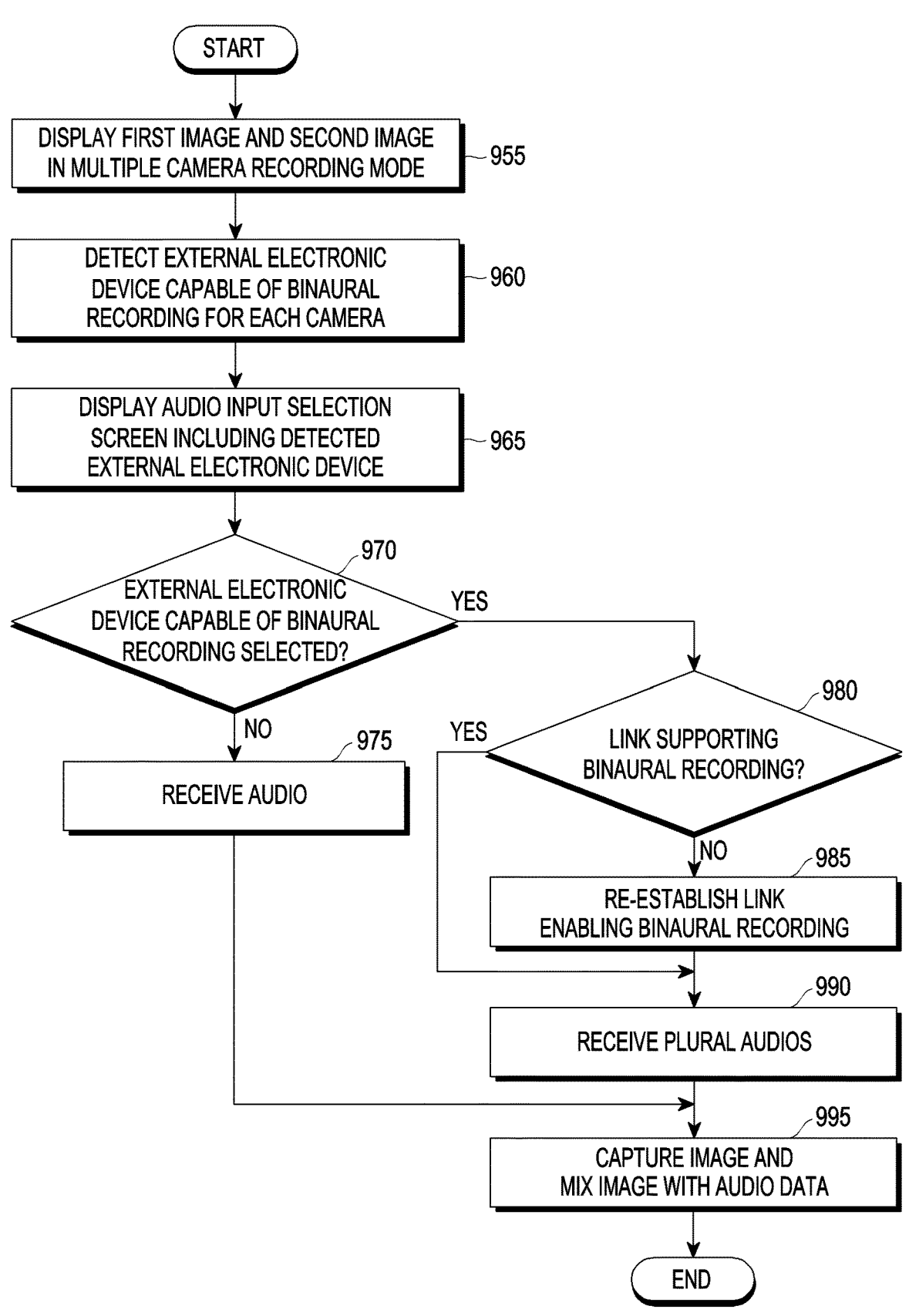
FIG. 9B is a flowchart illustrating an operation of automatically detecting binaural recording during multiple camera recording according to an embodiment of the disclosure.

FIG. 9B is a flowchart illustrating an operation of performing binaural recording during multiple camera recording according to an embodiment of the disclosure. According to embodiments of the disclosure, at least one of the operations described below may be omitted, combined with another operation, or reordered.

Referring to FIG. 9B, the electronic device 101 (e.g., the processor 120 in FIG. 1) may execute the camera application in the multiple camera recording mode in operation 955. In the multiple camera recording mode, the electronic device 101 may activate both the first camera (e.g., the front camera 701) and the second camera (e.g., the rear camera 703), and simultaneously output a first image (e.g., the image 825) obtained in real time from the first camera (e.g., the front camera 701) and a second image (e.g., the image 830) obtained in real time from the second camera (e.g., the rear camera 703).

In operation 960, the electronic device 101 may detect the presence of an external electronic device capable of binaural recording, available as an audio input to the first camera and/or the second camera in the multiple camera recording mode. In an embodiment of the disclosure, the electronic device 101 may detect the presence of an external electronic device (e.g., the first earbud 202 or the second earbud 204) located in a recording direction of the first camera (e.g., within a recording field of view of the first camera) by the first camera. In an embodiment of the disclosure, the electronic device 101 may detect the presence of the external electronic device (e.g., the first earbud 202 or the second earbud 204) located in the recording direction of the first camera by a directional communication technology, such as UWB.

In operation 965, the electronic device 101 may display an audio input selection screen (e.g., an audio input selection screen 1110 in FIG. 11) that includes the detected at least one external electronic device for the first image 825 of the first camera (e.g., the front camera 701) and the second image 830 of the second camera (e.g., the rear camera 703), during the display of the first image 825 and the second image 830 in the multiple camera recording mode or at the start of the multiple camera recording mode.

In an embodiment of the disclosure, the electronic device 101 may receive, through the audio input selection screen, a user input selecting an external electronic device (e.g., the first earbud 202, "Buds Pro (Left)") automatically detected as a first audio input corresponding to the first camera (e.g., the front camera 701). In an embodiment of the disclosure, the electronic device 101 may receive, through the audio input selection screen, a user input selecting an external electronic device (e.g., the second earbud 204, "Buds Pro (Right)") automatically detected as a second audio input corresponding to the second camera (e.g., the rear camera 703).

In operation 970, the electronic device 101 may determine from the user inputs whether a pair of external electronic devices (e.g., the first earbud 202 and the second earbud 204) supporting binaural recording have been selected as the first audio input and/or the second audio input.

When at least one external electronic device supporting binaural recording has not been selected as the first audio input and/or the second audio input, the electronic device 101 may proceed to operation 975. When at least one external electronic device supporting binaural recording has been selected as the first audio input and/or the second audio input, the electronic device 101 may proceed to operation 980.

In operation 975, the electronic device 101 may receive audio data from the external electronic device selected in operation 970 or from the microphone 705 of the electronic device 101, and proceed to operation 995. In an embodiment of the disclosure, when an external electronic device that does not support binaural recording has been selected, the electronic device 101 may receive monaural audio data using an existing single communication link (e.g., the communication link 405) established with the selected external electronic device. In operation 995, the electronic device 101 may mix and store the audio data with the first image 825 obtained from the front camera 701 and the second image 830 obtained from the rear camera 703.

In operation 980, the electronic device 101 may determine whether at least one communication link supporting binaural recording has been already established between the electronic device 101 and the external electronic device (e.g., the binaural wireless audio device 200) selected in operation 970. When at least one communication link (e.g., the LE links 410 and 415) supporting binaural recording has been established, the electronic device 101 may proceed to operation 990. On the contrary, when at least one communication link (e.g., the LE links 410 and 415) supporting binaural recording has not been established, for example, when a communication link (e.g., the communication link 405) that does not support binaural recording has been established, the electronic device 101 may proceed to operation 985.

In operation 985, the electronic device 101 may release the existing communication link (e.g., the communication link 405) from the selected external electronic device (e.g., the binaural wireless audio device 200) and re-establish at least one communication link (e.g., the LE links 410 and 415) enabling binaural recording with the selected external electronic device. In operation 990, the electronic device 101 may receive a plurality of audios from the selected external electronic device (e.g., the binaural wireless audio device 200) through the at least one communication link supporting binaural recording. In operation 995, the electronic device 101 may synchronize and mix the plurality of audio data received from the selected external electronic device with the first image 825 obtained from the front camera 701 and the second image 830 obtained from the rear camera 703. The electronic device 101 may store the first image 825 and the second image 830 together with the plurality of audio data according to at least one (e.g., the flowchart of FIG. 16) of the embodiments of the disclosure.

Figure 10A:
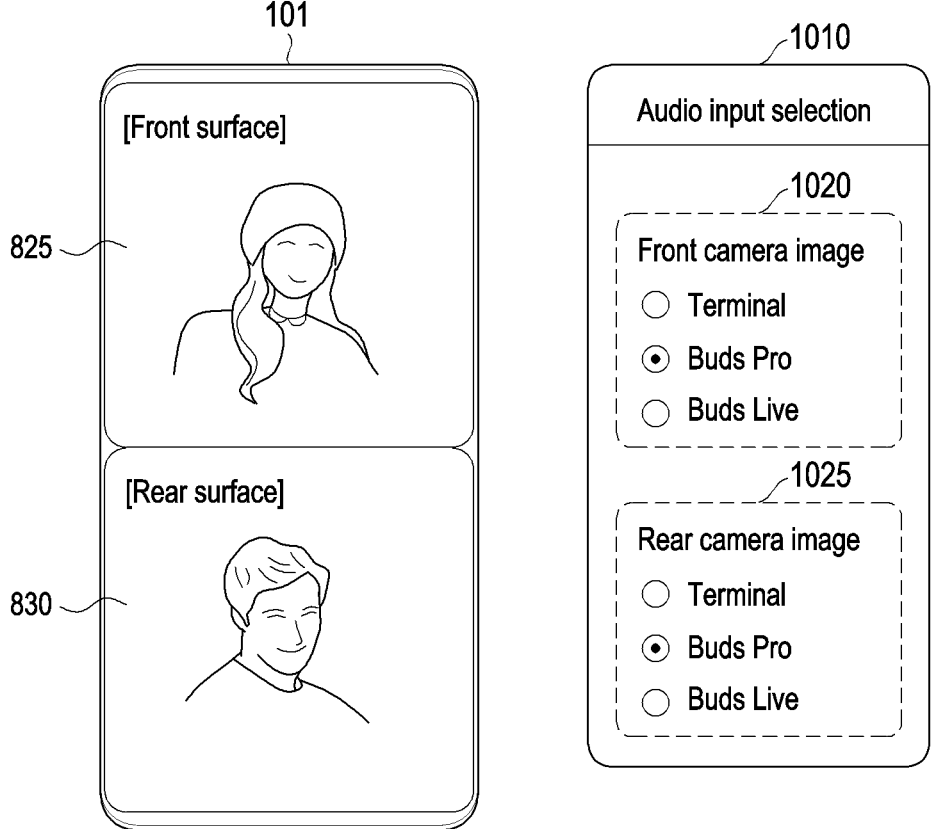
FIGS. 10A and 10B are diagrams illustrating audio input selection screens for multiple camera recording according to various embodiments of the disclosure.
Figure 10B:
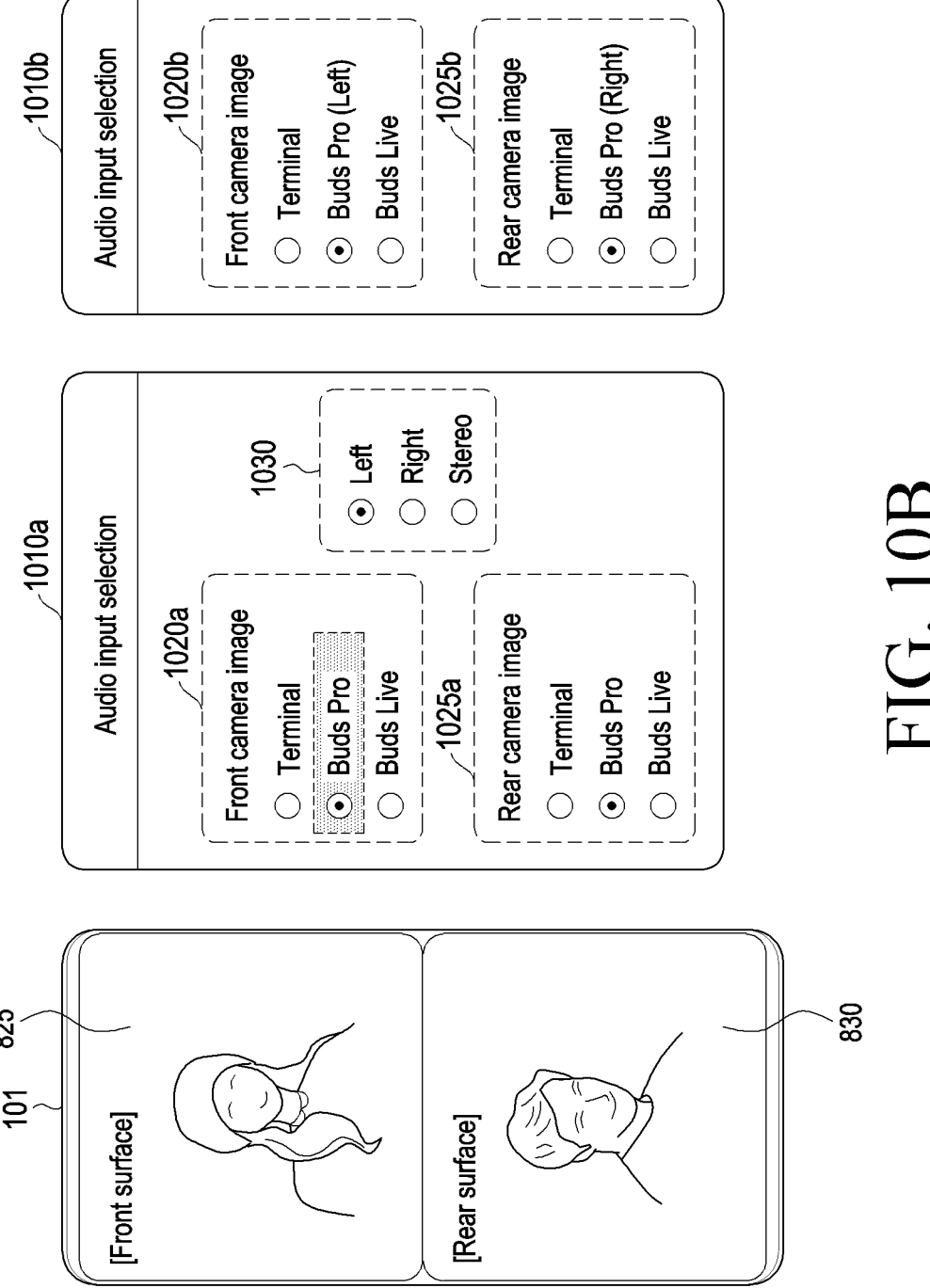

FIGS. 10A and 10B are diagrams illustrating an audio input selection screens for multiple camera recording according to various embodiments of the disclosure.

Referring to FIG. 10A, the electronic device 101 may display the audio input selection screen 1010 to select each of a first audio input for the first image 825 of the front camera 701 and a second audio input for the second image 830 of the rear camera 703 in the multiple camera recording mode. In an embodiment of the disclosure, the audio input selection screen 1010 may be displayed simultaneously with the first image 825 received in real time from the front camera 701 and the second image 830 received in real time from the rear camera 703, for example by obscuring at least a portion of the first image 825 and the second image 830.

In an embodiment of the disclosure, the audio input selection screen 1010 may include a first selection screen 1020 for the first image 825 of the front camera 701 and a second selection screen 1025 for the second image 830 of the rear camera 703. Each of the first selection screen 1020 and the second selection screen 1025 may include a plurality of audio inputs available for the electronic device 101, such as items corresponding to the microphone 705 of the electronic device 101 and at least one external electronic device (e.g., "Buds Pro" and "Buds Live").

Referring to FIG. 10B, when an external electronic device (e.g., the earbud device 200) supporting binaural recording is selected through an audio input selection screen 1010a on a first selection screen 1020a for the first image 825 of the front camera 701 and a second selection screen 1025a for the second image 830 of the rear camera 703, the electronic device 101 may display the option selection screen 1030 corresponding to the selected external electronic device. The option selection screen 1030 may include items corresponding to a left microphone, a right microphone, and a stereo input, respectively. For example, when an external electronic device (e.g., "Buds Pro") supporting binaural recording is selected on the first selection screen 1020a, the electronic device 101 may display the option selection screen 1030 for the first image 825 from the front camera 701.

In an embodiment of the disclosure, the electronic device 101 may receive a user input through an audio input selection screen 1010b selecting the left microphone for the front camera 701 through the option selection screen 1030 and display a first selection screen 1020b including information indicating the use of the left microphone (e.g., the first earbud 202) for the front camera 701 and a second selection screen 1025b including information indicating the use of the right microphone (e.g., the second earbud 204) for the rear camera 703. When audio inputs, such as the first selection screen 1020b and the second selection screen 1025b are completely selected, the electronic device 101 may receive monaural first audio data from the first earbud 202 and mix and store the first audio data with the first image 825 from the front camera 701, and may receive monaural second audio data from the second earbud 204 and mix and store the second audio data with the second image 830 from the rear camera 703.

In an embodiment of the disclosure, when the electronic device 101 receives a user input selecting a stereo input for the front camera 701 through the option selection screen 1030, the electronic device 101 may generate stereo audio data by mixing the monaural first audio data received from the first earbud 202 with the monaural second audio data received from the second earbud 204, store the stereo audio together with the first image 825 in a first file, and store the stereo audio together with the second image 825 in a second file. In an embodiment of the disclosure, the electronic device 101 may store the stereo audio together with the first image 825 and the second image in a single file.

Figure 11:
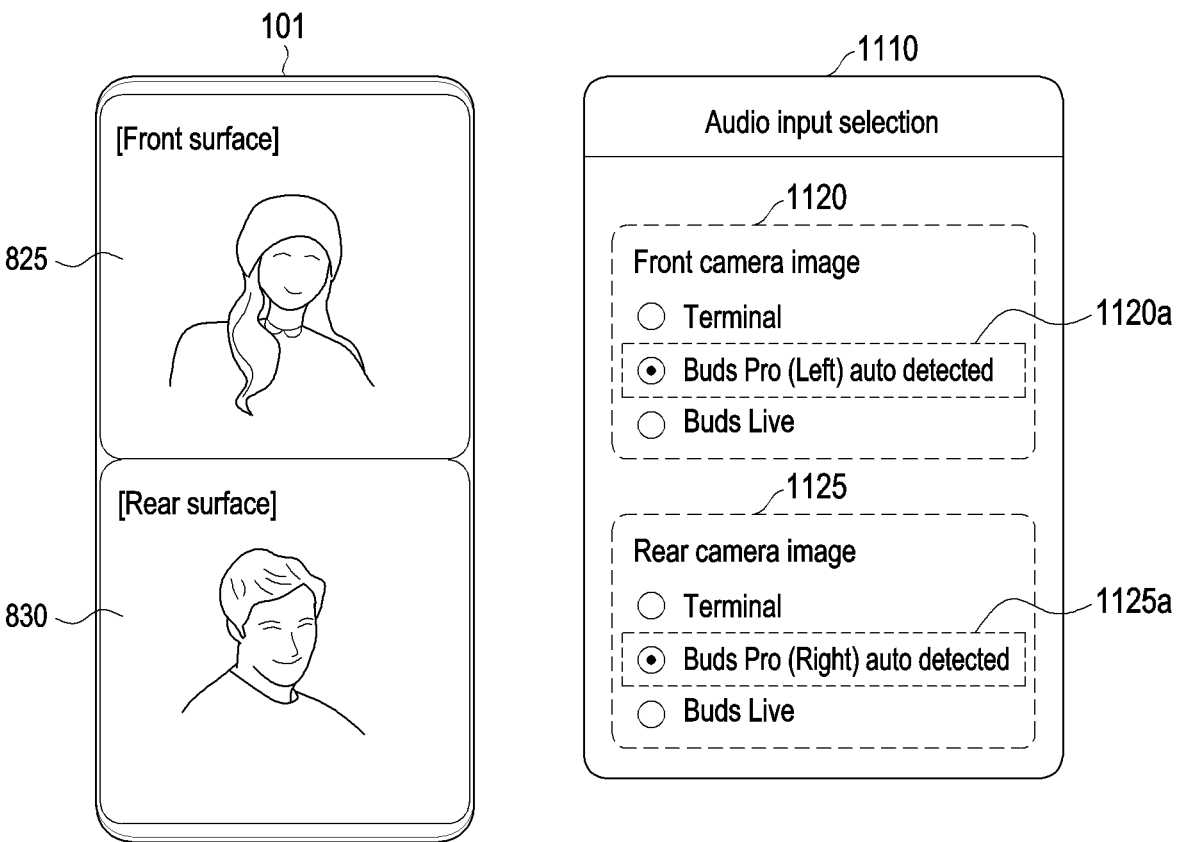
FIG. 11 is a diagram illustrating an audio input selection screen, when an audio input for multiple camera recording is automatically detected according to an embodiment of the disclosure.

FIG. 11 is a diagram illustrating an audio input selection screen, when an audio input for multiple camera recording is automatically detected according to an embodiment of the disclosure.

Referring to FIG. 11, the electronic device 101 may automatically detect an external electronic device capable of an audio input, connected to the electronic device 101 to determine a first audio input for the first image 825 of the front camera 701 and a second audio input for the second image 830 of the rear camera 703 in the multiple camera recording mode. In an embodiment of the disclosure, the electronic device 101 may identify an external electronic device (e.g., the first earbud 202 or the second earbud 204) detected by either (e.g., the front camera 701 or the rear camera 703) of the cameras of the electronic device 101, automatically match the detected external electronic device with the image captured by the camera, and/or display information 1120a or 1125a indicating the detected external electronic device on the audio input selection screen 1110.

In an embodiment of the disclosure, the electronic device 101 may identify by the wireless communication module 194 that an external electronic device (e.g., the first earbud 202) supporting an audio input is located in a direction that a specific camera (e.g., the front camera 701) faces, using a directional communication technology, such as UWB. For example, the electronic device 101 may display the information 1120a indicating that the first earbud 202 has been automatically detected, for example, "Buds Pro (Left) (auto-detected)," within a first selection screen 1120 for the first image 825 of the front camera 701, and information 1120a indicating that the second earbud 204 has been automatically detected, for example, "Buds Pro (Right) (auto-detected)," within a second selection screen 1125 for the second image 830 of the rear camera 703, on the audio input selection screen 1110. In an embodiment of the disclosure, the electronic device 101 may receive a user input acknowledging the use of the automatically detected external electronic device, and determine to use the first earbud 202 for the front camera 701 and the second earbud 204 for the rear camera 703.

Figure 12:
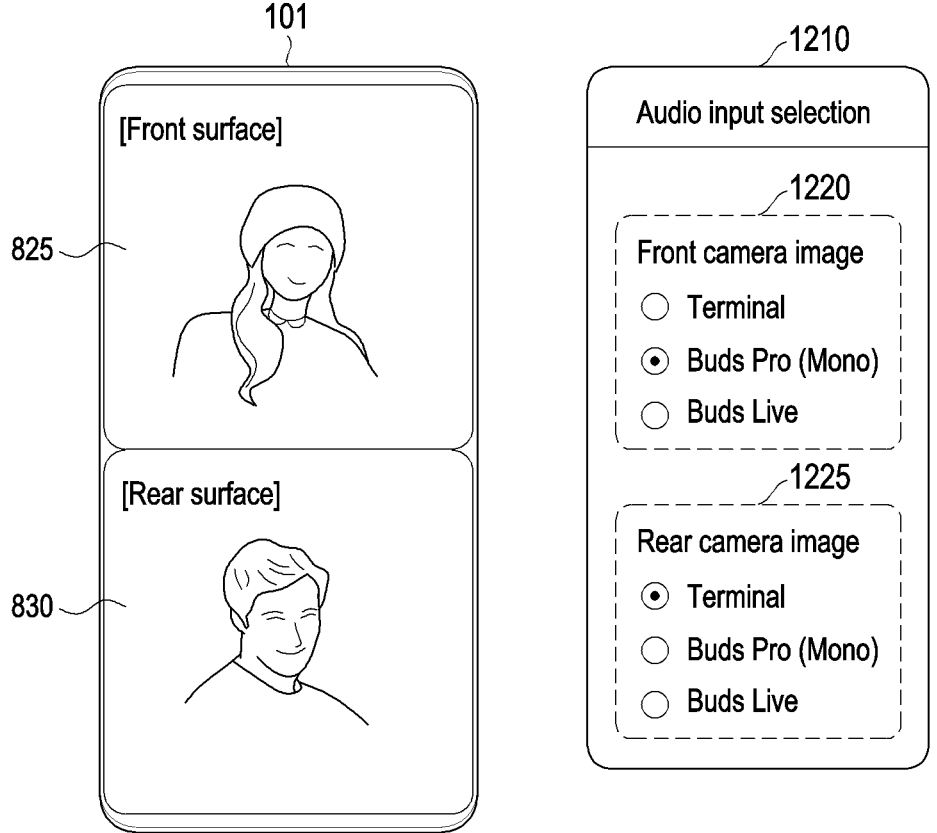
FIG. 12 is a diagram illustrating a selection screen for selecting an audio input that does not support binaural recording for multiple camera recording according to an embodiment of the disclosure.

FIG. 12 is a diagram illustrating a selection screen for selecting an audio input that does not support binaural recording for multiple camera recording according to an embodiment of the disclosure.

Referring to FIG. 12, when an external electronic device connected to the electronic device 101 does not support binaural recording, the electronic device 101 may provide items to select a single audio input through a first selection screen 1220 for the first image 825 of the front camera 701 and a second selection screen 1225 for the second image 830 of the rear camera 703 on an audio input selection screen 1210 for selecting a first audio input for the first image 825 of the front camera 701 and a second audio input for the second image 830 of the rear camera 703, respectively.

In an embodiment of the disclosure, the electronic device 101 may display information (e.g., "Buds Pro (Mono)") indicating that a selectable external electronic device provides monaural audio data through the first selection screen 1220 and the second selection screen 1225. In an embodiment of the disclosure, when an external electronic device providing monaural audio data (e.g., "Buds Pro (Mono)") is selected on the first selection screen 1220 for the first image 825 of the front camera 701, the electronic device 101 may automatically select the microphone 705 of the electronic device 101 for the second image 830 of the rear camera 703 on the second selection screen 1225.

Figure 13:
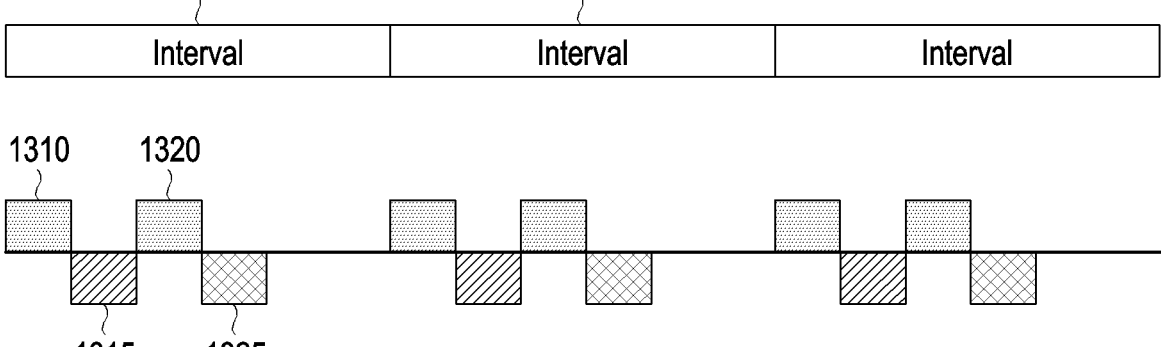
FIG. 13 is a diagram illustrating an operation of receiving audio data from a plurality of audio devices according to an embodiment of the disclosure.

FIG. 13 is a diagram illustrating an operation of receiving audio data from a plurality of audio devices according to an embodiment of the disclosure.

Referring to FIG. 13, the electronic device 101 may distinguishably receive a plurality of audio data from a plurality of audio devices (e.g., the first earbud 202 and the second earbud 204) included in an external electronic device (e.g., the binaural wireless audio device 200) supporting binaural recording during multiple camera recording. For example, the electronic device 101 may transmit audio data to the first and second audio devices in first and third slots 1310 and 1320, respectively, during one time interval 1305. In an embodiment of the disclosure, the first slot 1310 may be allocated for transmission to the first audio device (e.g., first earbud 202), and the third slot 1320 may be allocated for transmission to the second audio device (e.g., the second earbud 204).

For example, the electronic device 101 may receive first audio data from the first audio device in a second slot 1315 and second audio data from the second audio device in a fourth slot 1325 within the first time interval 1305. Likewise, the electronic device 101 and the first and second audio devices may perform the operations of transmitting and receiving a plurality of audio data during a next time interval 1330. In an embodiment of the disclosure, the electronic device 101 may mix and store the first audio data with the first image 825, and mix and store the second audio data with the second image 830.

Figure 14:
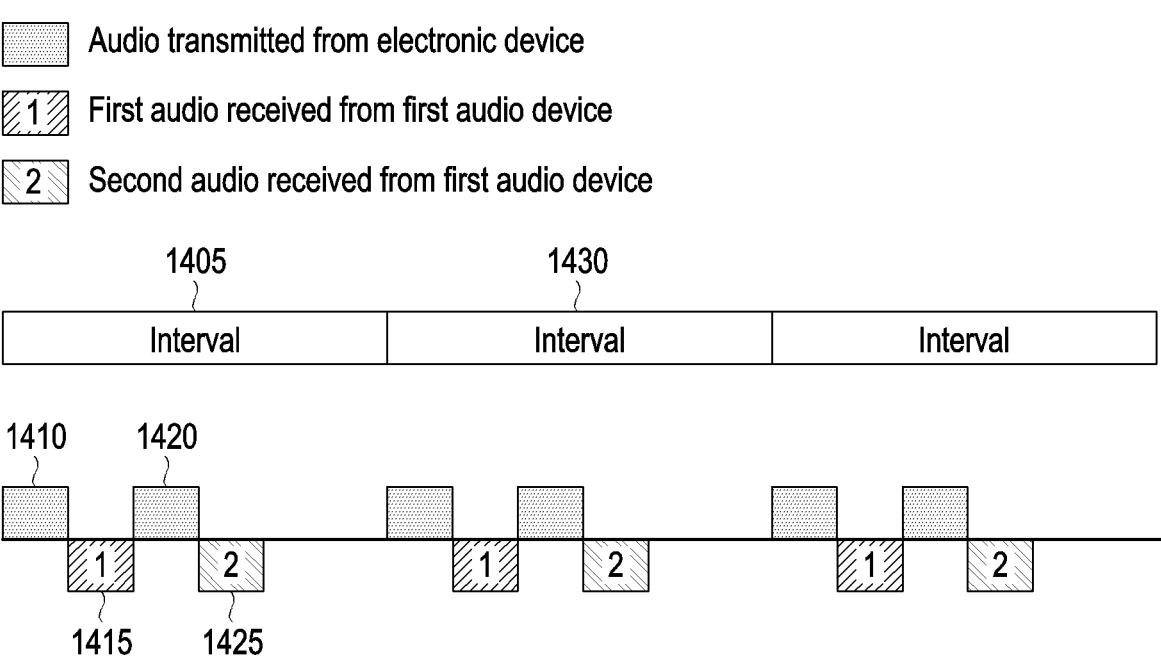
FIG. 14 is a diagram illustrating an operation of receiving a plurality of audio data from a single audio device according to an embodiment of the disclosure.

FIG. 14 is a diagram illustrating an operation of receiving a plurality of audio data from one audio device according to an embodiment of the disclosure.

Referring to FIG. 14, the electronic device 101 may distinguishably receive a plurality of audio data from a first audio device having a plurality of microphones supporting binaural recording during multiple camera recording. For example, the electronic device 101 may transmit audio data to the first audio device in first and third slots 1410 and 1420 within one time interval 1405. For example, the electronic device 101 may receive first audio data obtained by a first microphone of the first audio device in a second slot 1415 within the first time interval 1405 from the first audio device, and receive second audio data obtained by a second microphone of the first audio device in a fourth slot 1425 from the first audio device. Likewise, the electronic device 101 and the first audio device may perform the operations of transmitting and receiving a plurality of audio data during a next time interval 1430. In an embodiment of the disclosure, the electronic device 101 may mix and store the first audio data with the first image 825 and mix and store the second audio data with the second image 830.

Figure 15:
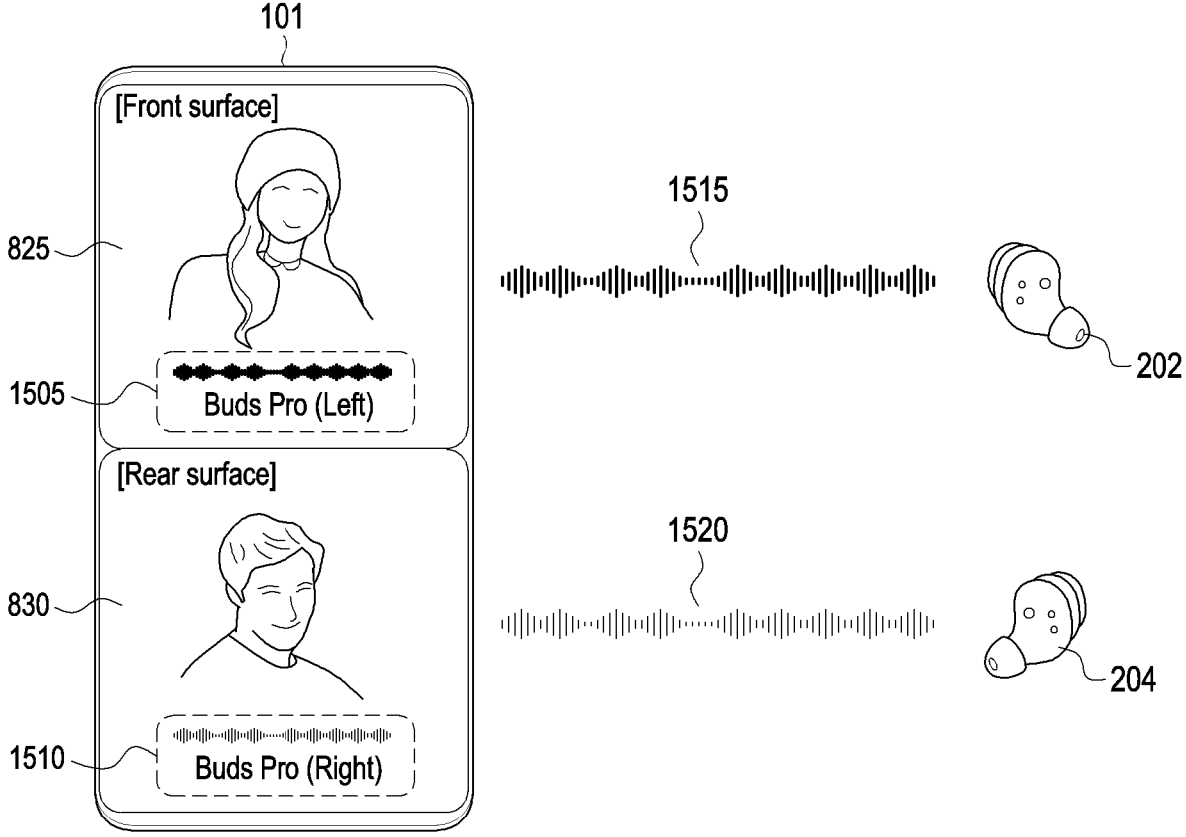
FIG. 15 is a diagram illustrating an operation of performing binaural recording during multiple camera recording according to an embodiment of the disclosure.

FIG. 15 is a diagram illustrating an operation of performing binaural recording during multiple camera recording according to an embodiment of the disclosure.

Referring to FIG. 15, the electronic device 101 may mix and store the first image 825 with first audio data 1515 received from a selected first audio device (e.g., the first earbud 202) for the first image 825, while displaying the first image 825 from the front camera 701. In an embodiment of the disclosure, the electronic device 101 may display, along with the first image 825, a name (e.g., "Buds Pro (Left)") identifying the first audio device (e.g., the first earbuds 202) corresponding to the first image 825 and information 1505 indicating an audio reception sensitivity of the first audio data 1515 received from the first audio device.

Similarly, the electronic device 101 may display, along with the second image 830, a name (e.g., "Buds Pro (Right)") identifying a second audio device (e.g., the second earbud 204 or another audio device) selected for the second image 830 and information 1510 indicating an audio reception sensitivity of second audio data 1520 received from the second audio device. In an embodiment of the disclosure, the second audio device may be an audio device (e.g., the second earbud 204) paired with the first audio device or a separate binaural wireless audio device.

Figure 16:
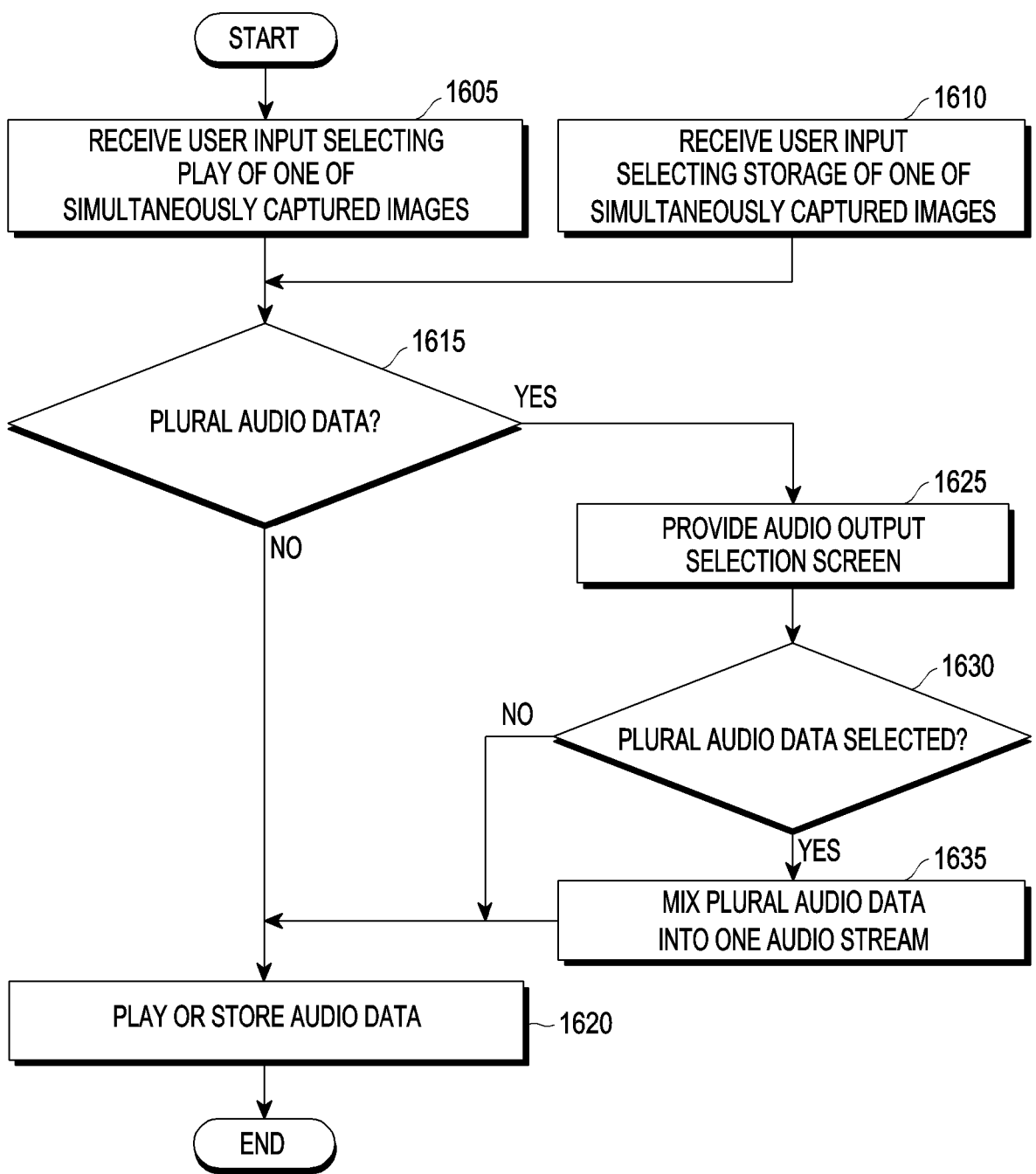
FIG. 16 is a flowchart illustrating an operation of playing or extracting audio data which is input through binaural recording according to an embodiment of the disclosure.

FIG. 16 is a flowchart illustrating an operation of playing or extracting audio data which is input through binaural recording according to an embodiment of the disclosure.

According to embodiments of the disclosure, at least one of the operations described below may be omitted, combined with another operation, or reordered. In an embodiment of the disclosure, the first image 825, the second image 830, and a plurality of audio data generated simultaneously through multiple camera recording may be stored in a single file, and the electronic device 101 may execute operation 1605 or operation 1610 according to a user input.

Referring to FIG. 16, in an embodiment of the disclosure, the electronic device 101 (e.g., the processor 120 of FIG. 1) may receive a user input requesting play of an image (e.g., the first image 825 captured by the front camera 701) selected from the first image 825 and the second image 830 captured simultaneously by multiple camera recording in operation 1605, and proceed to operation 1615. In an embodiment of the disclosure, the electronic device 101 may receive a user input requesting to extract an image (e.g., the first image 825) selected from the first image 825 and the second image 830 simultaneously captured by multiple camera recording and store the image in a separate file in operation 1610, and proceed to operation 1615.

In operation 1615, the electronic device 101 may determine whether there are a plurality of audio data related to the selected image. In an embodiment of the disclosure, the electronic device 101 may identify that a plurality of audio data (e.g., first audio data received from the first earbud 202 and second audio data received from the second earbud 204) recorded during the capturing of the selected image were stored together with the selected image. In the presence of a plurality of audio data related to the first image 825, the electronic device 101 may proceed to operation 1625.

On the contrary, when there are not a plurality of audio data, the electronic device 101 may proceed to operation 1620. In operation 1620, when receiving the user input of operation 1605, the electronic device 101 may play the selected image (e.g., the first image 825) together with corresponding audio data (e.g., the first audio data). When receiving the user input of operation 1610, the electronic device 101 may store the selected image (e.g., the first image 825) together with the corresponding audio data (e.g., the first audio data), separately from another image (e.g., the second image 830) captured at the same time, in operation 1620.

In operation 1625, the electronic device 101 may display an audio output selection screen (e.g., an audio output selection screen 1715 in FIG. 17A) for selecting at least one of the plurality of audio data related to the selected image. The electronic device 101 may receive a user input selecting at least one of the plurality of audio data related to the selected image through the audio output selection screen. In an embodiment of the disclosure, the audio output selection screen may include an item to select default a specified audio data for a selected image and/or an item to select a plurality of audio data corresponding to a plurality of images captured simultaneously.

In operation 1630, the electronic device 101 may determine whether a plurality of audio data have been selected on the audio output selection screen. When one audio data (e.g., the first audio data received from the first earbud 202) specified for the first image 825 has been selected, the electronic device 101 may proceed to operation 1620. On the contrary, when the plurality of audio data (e.g., the first audio data received from the first earbud 202 and the second audio data received from the second earbud 204) related to the first image 825 have been selected, the electronic device 101 may proceed to operation 1635. In operation 1635, the electronic device 101 may mix the plurality of audio data related to the selected image into a single audio stream and proceed to operation 1620.

When receiving the user input of operation 1605, the electronic device 101 may play the selected image (e.g., the first image 825) together with the mixed audio stream (e.g., including the first audio data and the second audio data) in operation 1620. When receiving the user input of operation 1610, the electronic device 101 may store the selected image (e.g., the first image 825) together with the mixed audio stream, separately from the other image (e.g., the second image 830) captured at the same time, in operation 1620.

Figure 17A:
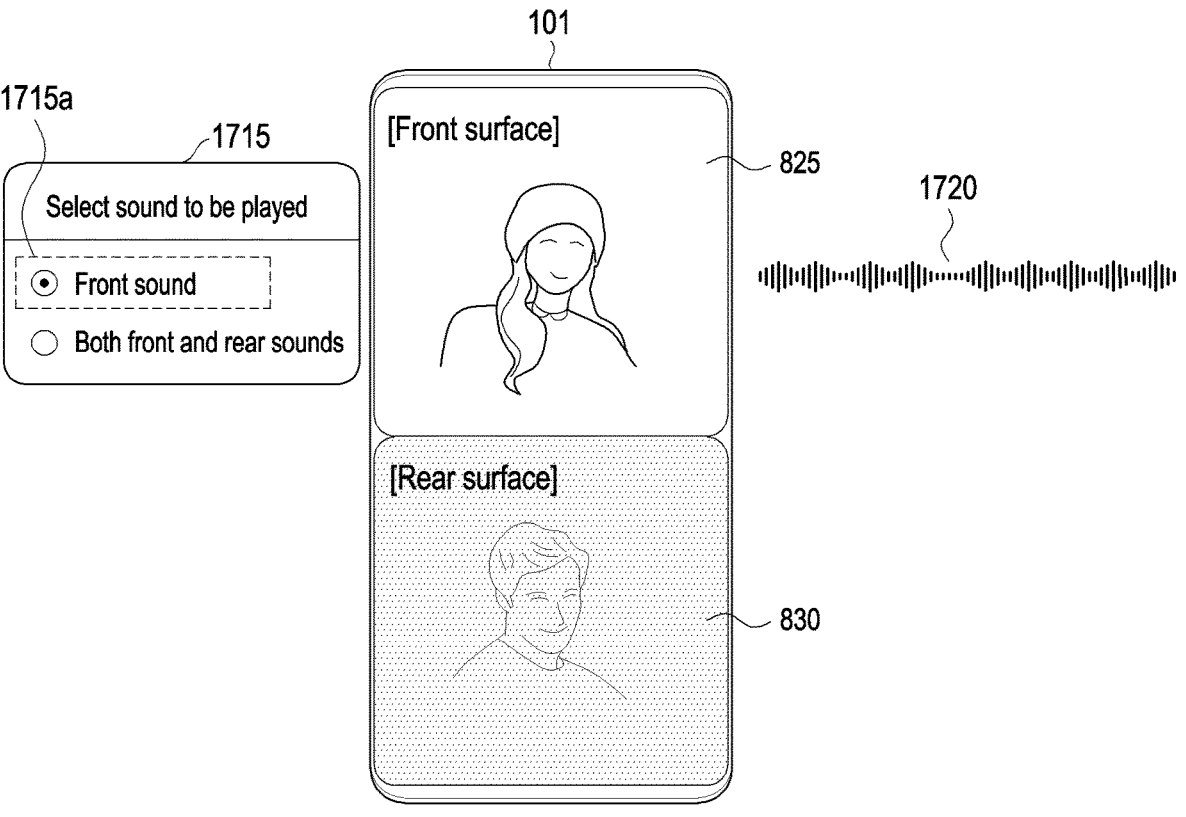
FIGS. 17A and 17B are diagrams illustrating selection screens for selecting an audio output for playing simultaneously captured images according to various embodiments of the disclosure.
Figure 17B:
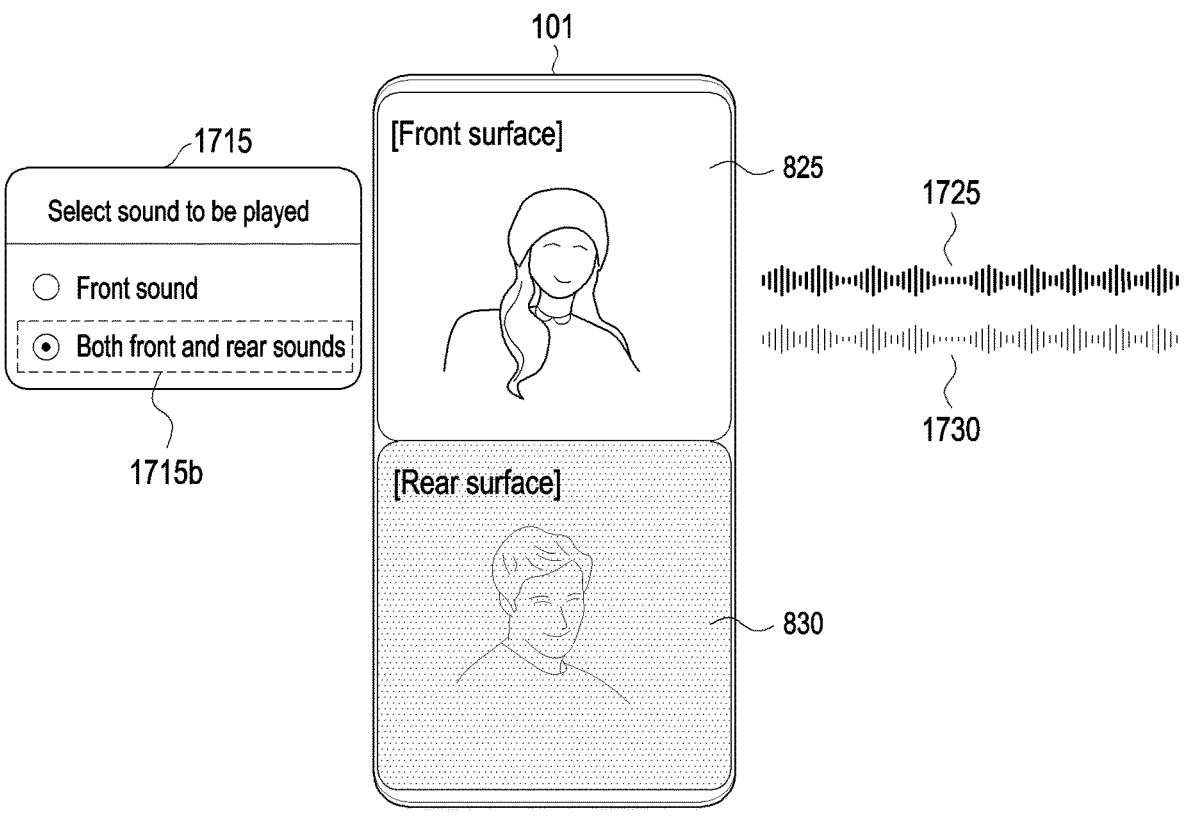

FIGS. 17A and 17B are diagrams illustrating selection screens for selecting an audio output for playing simultaneously captured images according to various embodiments of the disclosure.

Referring to FIG. 17A, when requested to play the first image 825 from the front camera 701, the electronic device 101 may display the audio output selection screen 1715 that includes an item (e.g., "front sound") to select audio data corresponding to the front camera 701 and an item (e.g., "both front and rear sounds") to select audio data corresponding to both the front camera 701 and the rear camera 703, before starting play. When receiving a user input 1715a selecting the item of "front sound" through the audio output selection screen 1715, the electronic device 101 may play the first image 825 with first audio data 1720.

Referring to FIG. 17B, when receiving a user input 1715b selecting the item of "both front and rear sounds" through the audio output selection screen 1715, the electronic device 101 may play the first image 825 together with first audio data 1725 and second audio data 1730.

Figure 18:
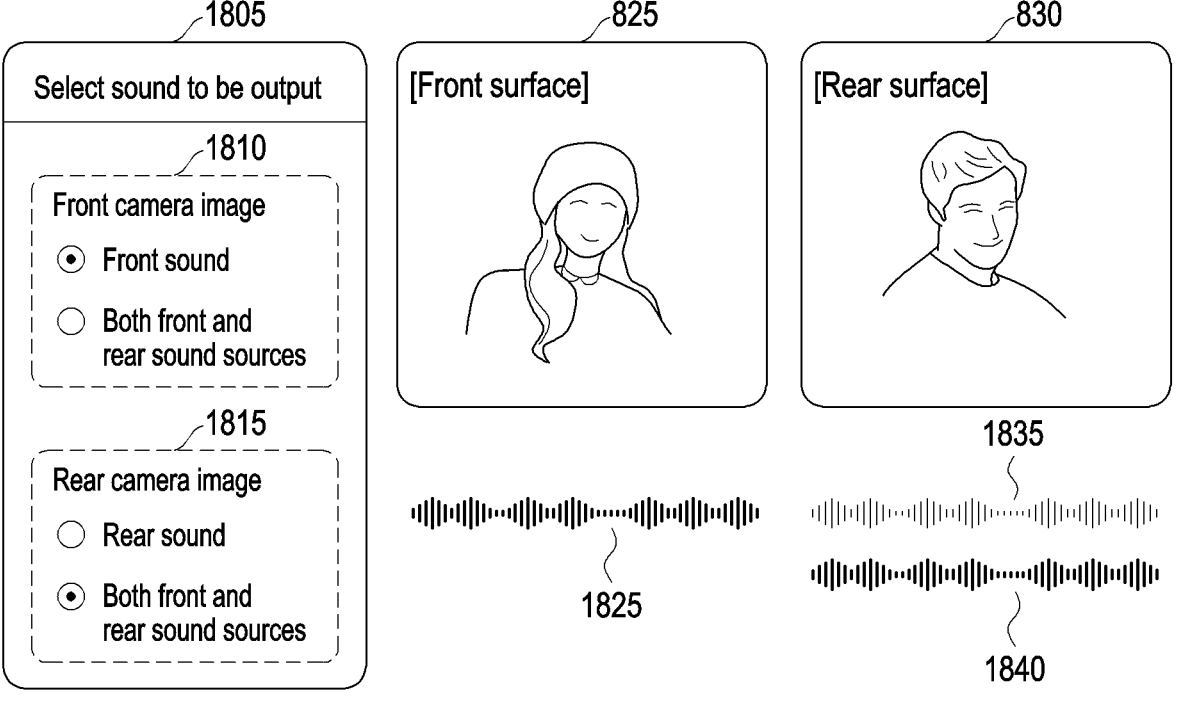
FIG. 18 is a diagram illustrating a selection screen for selecting an audio output for separating simultaneously captured images according to an embodiment of the disclosure.

FIG. 18 is a diagram illustrating a selection screen for selecting an audio output to separate simultaneously captured images according to an embodiment of the disclosure.

Referring to FIG. 18, when requested to separately store images which have been simultaneously captured during multiple camera recording, the electronic device 101 may display an audio output selection screen 1805 for selecting audio data corresponding to the first image 825 (e.g., "front camera image") of the front camera 701 and audio data corresponding to the second image 830 (e.g., "rear camera image") of the rear camera 703, respectively. The audio output selection screen 1805 may include a first selection screen 1810 to select audio data corresponding to the front camera 701 and a second selection screen 1815 to select audio data corresponding to the rear camera 703.

In an embodiment of the disclosure, the first selection screen 1810 may include an item (e.g., "front sound") to select audio data corresponding to the front camera 701 and an item (e.g., "both front and rear sounds") to select a plurality of audio data corresponding to both the front camera 701 and the rear camera 703. In an embodiment of the disclosure, the second selection screen 1815 may include an item to select audio data (e.g., "front sound") corresponding to the rear camera 703 and an item to select the plurality of audio data (e.g., "both front and rear sounds") corresponding to both the front camera 701 and the rear camera 703.

When the item of "front sound" is selected through the first selection screen 1810 on the audio output selection screen 1815, the electronic device 101 may play the first image 825 together with the first audio data 1825. When the item of "both front and rear sounds" is selected through the second selection screen 1815 on the audio output selection screen 1810, the electronic device 101 may play the second image 830 together with first audio data 1835 and second audio data 1840.

Figure 19A:
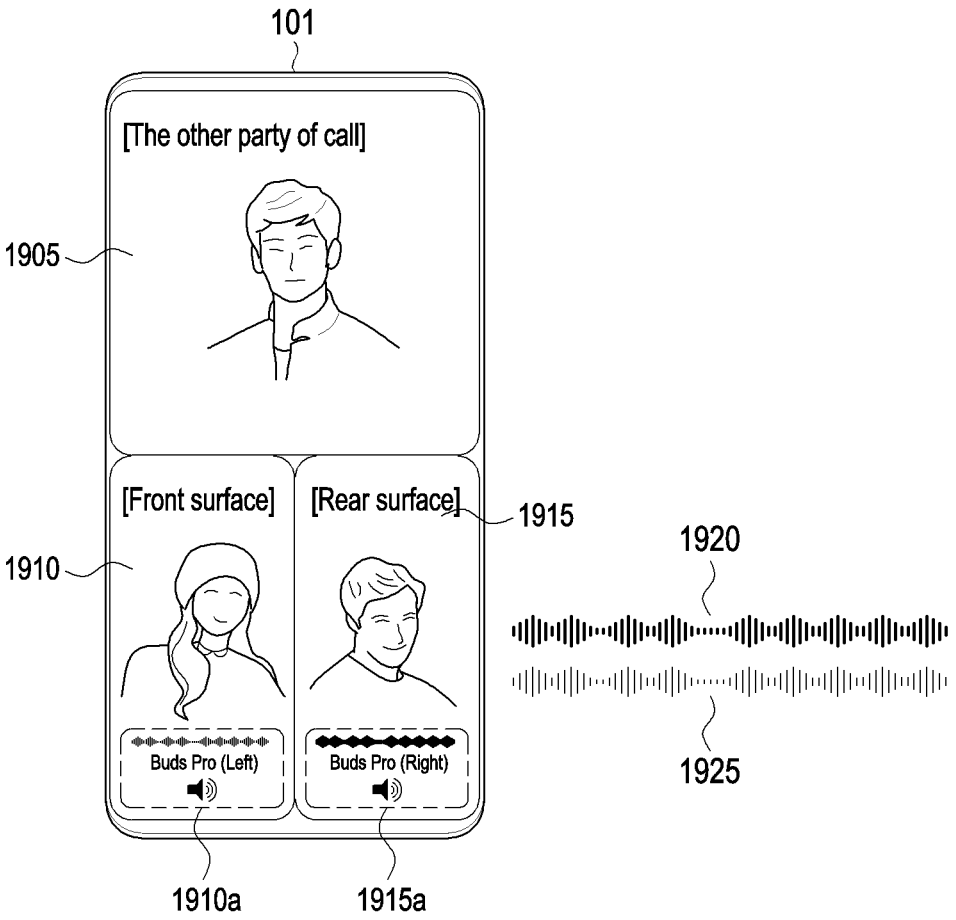
FIGS. 19A and 19B are diagrams illustrating a video call using multiple cameras according to various embodiments of the disclosure.
Figure 19B:
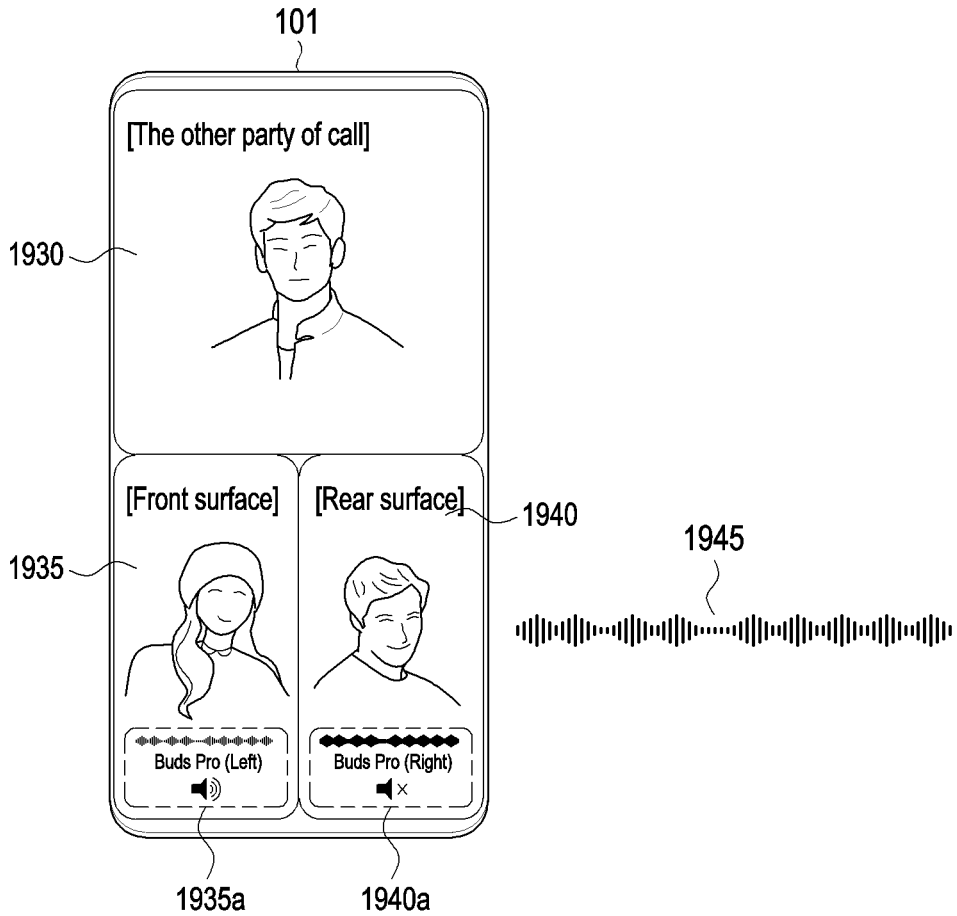

FIGS. 19A and 19B are diagrams illustrating a screen for a video call using multiple cameras according to various embodiments of the disclosure.

Referring to FIG. 19A, the electronic device 101 may display an image 1905 received from the other party conducting a video call, simultaneously with a third image 1910 obtained in real time through the first camera (e.g., the front camera 701) and a fourth image 1915 obtained in real time through the second camera (e.g., the rear camera 703).

Although the image 1905 of the other party, the third image 1910, and the fourth image 1915 are displayed in separate areas in the example, the third image 1910 may be displayed in a first display area, the fourth image 1915 may be displayed in a second display area that does not overlap with the first display area, and the image 1905 of the other party may be displayed in a portion of the first display area and a portion of the second display area in another embodiment. In an embodiment of the disclosure, the electronic device 101 may a foldable device, and the first display area and the second display area may be distinguished from each other by a folding boundary.

In an embodiment of the disclosure, the electronic device 101 may receive a user input selecting a first audio device (e.g., the first earbud 202) for the third image 1910 from the front camera 701 and a second audio device (e.g., the second earbuds 204) for the fourth image 1915 from the rear camera 703, at the beginning of the video call or during the video call. In an embodiment of the disclosure, the user input may be received by the electronic device 101 through an audio input selection screen (e.g., the audio input selection screen 1010 in FIG. 10A) to select an audio input corresponding to the front camera 701 and an audio input corresponding to the rear camera 703, respectively from among a plurality of audio inputs. In response to the user input through the audio input selection screen, the electronic device 101 may receive third audio data 1920 from the first earbud 202 and fourth audio data 1925 from the second earbud 204, mix the first and second audio data 1920 and 1925 into a single audio stream, and transmit the audio stream to the other party.

In an embodiment of the disclosure, the electronic device 101 may display a name (e.g., "Buds Pro (Left)") identifying the first earbud 202 corresponding to the third image 1910 and information 1910a indicating an audio reception sensitivity of the first audio data 1920 received from the first earbud 202, along with the third image 1910 from the front camera 701. Similarly, the electronic device 101 may display a name (e.g., "Buds Pro (Right)") identifying the second earbud 204 corresponding to the second image 1915 and information 1915a indicating the audio reception sensitivity of the second audio data 1925 received from the second earbud 204, along with the fourth image 1915 from the rear camera 703.

Referring to FIG. 19B, when one audio input, for example, a first audio input corresponding to the front camera 701 (e.g., the first earbud 202) is selected through an audio input selection screen 1930 at the beginning of a video call or during the video call, the electronic device 101 may transmit first audio data 1945 received through the first earbud 202 to the other party.

In an embodiment of the disclosure, the electronic device 101 may display a name (e.g., "Buds Pro (Left)") identifying the first earbud 202 corresponding to the third image 1935 and information 1935a indicating the audio reception sensitivity of the first audio data 1945 received from the first earbud 202, along with the third image 1935 from the front camera 701. Meanwhile, the electronic device 101 may display a name (e.g., "Buds Pro (Right)") identifying the second earbud 204 corresponding to the fourth image 1915 and information 1940a indicating that the second earbud 204 has not been selected, along with the fourth image 1915 from the rear camera 703.

An electronic device according to embodiments of the disclosure may separately receive audio data for a front camera and audio data for a rear camera through binaural recording during multiple camera recording using the front camera and the rear camera, and store each of the audio data in synchronization with image data obtained through the front or rear camera corresponding to the audio data.

An electronic device according to embodiments of the disclosure may distinguishably store audio data corresponding to image data of a front camera and audio data corresponding to image data of a rear camera, and play mixed audio data for each image data in response to a user input.

Embodiments of the disclosure may provide a function of separately storing or playing each image during simultaneous recording using a front camera and a rear camera in an electronic device.

Embodiments of the disclosure may provide a function of recording audio data through a plurality of audio devices capable of binaural recording during simultaneous recording using a front camera and a rear camera, thereby avoiding the problem of imbalance in the voice loudness of multiple speakers.

An electronic device according to an embodiment may include the first camera 701, the second camera 703, the display module 160, the communication circuit 192, and the at least one processor 120 operatively coupled to the first camera, the second camera, and the communication circuit. The at least one processor may be configured to display a first image obtained from the first camera and a second image obtained from the second camera through the display in a multiple camera recording mode. The at least one processor may be configured to display an audio input selection screen related to a plurality of audio inputs through the display. The audio input selection screen may include an item to select a microphone of the electronic device and an item to select an external electronic device connected to the electronic device through at least one Bluetooth communication link. The at least one processor may be configured to receive a first user input selecting the external electronic device through the audio input selection screen. The at least one processor may be configured to, in response to the first user input, establish a first communication link and a second communication link for supporting binaural recording with a first earbud and a second earbud included in the external electronic device, respectively, through the communication circuit. The at least one processor may be configured to receive first audio data obtained from the first earbud through the first communication link, and receive second audio data obtained from the second earbud through the second communication link, while performing a recording using the first camera and the second camera simultaneously. The at least one processor may be configured to store the first image in synchronization with the first audio data, and store the second image in synchronization with the second audio data.

According to an embodiment of the disclosure, the at least one processor may be configured to display an option selection screen corresponding to the first camera in response to the first user input, wherein the option selection screen includes an item to select the first earbud, an item to select the second earbud, and an item to select a stereo input, and receive a second user input selecting the first earbud through the option selection screen.

According to an embodiment of the disclosure, the at least one processor may be configured to receive a third user input selecting the stereo input through the option selection screen, receive, in response to the third user input, third audio data obtained from the first earbud and fourth audio data obtained from the second earbud through the first and second communication links, generate stereo audio data by mixing the third audio data with the fourth audio data, and store the first image in synchronization with the stereo audio data, and store the second image in synchronization with the stereo audio data.

According to an embodiment of the disclosure, the audio input selection screen may include information indicating that the first earbud is detected for the first camera and/or information indicating that the second earbud is detected for the second camera.

According to an embodiment of the disclosure, the at least one camera may be configured to detect the presence of the first earbud within a recording field of view of the first camera, or detect the presence of the first earbud in a recording direction of the first camera by the communication circuit.

According to an embodiment of the disclosure, the first earbud may include at least one microphone for the binaural recording, and the second audio device may include at least one microphone for the binaural recording.

According to an embodiment of the disclosure, the at least one processor may display information identifying the first earbud and an audio reception sensitivity of the first audio data, along with the first image.

According to an embodiment of the disclosure, the at least one processor may be configured to receive information indicating whether the external electronic device supports the binaural recording from the external electronic device.

According to an embodiment of the disclosure, the at least one processor may be configured to receive a fourth user input requesting to play at least one of the first image or the second image, display an audio output selection screen related to the first audio data and the second audio data in response to the fourth user input, receive a fifth user input selecting at least one of the first audio data or the second audio data through the audio output selection menu, and play the selected image and the selected at least one audio in synchronization with each other in response to the fifth user input.

According to an embodiment of the disclosure, the at least one processor may be configured to receive a sixth user input requesting to extract at least one of the first image or the second image, display an audio output selection screen related to the first audio data and the second audio data in response to the sixth user input, receive a seventh user input selecting at least one of the first audio data or the second audio data through the audio output selection menu, and in response to the seventh user input, store the selected image and the selected at least one audio in synchronization with each other.

According to an embodiment of the disclosure, the at least one processor may be configured to display an image received from the other party of a call, a third image obtained from the first camera, and a fourth image obtained from the second camera, in a video call mode, receive an eighth user input selecting the first earbud for the first camera and the second earbud for the second camera, for the video call mode, receive fifth audio data from the first earbud and sixth audio data from the second earbud in response to the eighth user input, mix the fifth audio data and the sixth audio data into a single audio stream, and transmit the mixed audio stream to the other party.

An audio recording method performed by an electronic device according to an embodiment may include operation 905 for displaying a first image obtained from a first camera and a second image obtained from a second camera through a display in a multiple camera recording mode. The audio recording method may include operation 910 for displaying an audio input selection screen related to a plurality of audio inputs through the display. The audio input selection screen may include an item to select a microphone of the electronic device and an item to select an external electronic device connected to the electronic device through at least one Bluetooth communication link. The audio recording method may include operation 915 for receiving a first user input selecting the external electronic device through the audio input selection screen. The audio recording method may include operation 945 for in response to the first user input, establishing a first communication link and a second communication link for supporting binaural recording with a first earbud and a second earbud included in the external electronic device, respectively. The audio recording method may include operation 950 for receiving first audio data obtained from the first earbud through the first communication link, and receiving second audio data obtained from the second earbud through the second communication link, while performing a recording using the first camera and the second camera simultaneously. The audio recording method may include operation 930 for storing the first image in synchronization with the first audio data, and storing the second image in synchronization with the second audio data.

According to an embodiment of the disclosure, the audio recording method may further include displaying an option selection screen corresponding to the first camera in response to the first user input, wherein the option selection screen includes an item to select the first earbud, an item to select the second earbud, and an item to select a stereo input, and receiving a second user input selecting the first earbud through the option selection screen.

According to an embodiment of the disclosure, the audio recording method may further include receiving a third user input selecting the stereo input through the option selection screen, receiving third audio data obtained from the first earbud and fourth audio data obtained from the second earbud through the first and second communication links, in response to the third user input, generating stereo audio data by mixing the third audio data with the fourth audio data, storing the first image in synchronization with the stereo audio data, and storing the second image in synchronization with the stereo audio data.

According to an embodiment of the disclosure, the audio input selection screen may include information indicating that the first earbud is detected for the first camera and/or information indicating that the second earbud is detected for the second camera.

According to an embodiment of the disclosure, the audio recording method may further include at least one of detecting the presence of the first earbud within a recording field of view of the first camera, or detecting the presence of the first earbud in a recording direction of the first camera by the communication circuit.

According to an embodiment of the disclosure, the first earbud may include at least one microphone for the binaural recording, and the second earbud may include at least one microphone for the binaural recording.

According to an embodiment of the disclosure, the audio recording method may further include displaying informa-tion identifying the first earbud and information indicating an audio reception sensitivity of the first audio data, along with the first image.

According to an embodiment of the disclosure, the audio recording method may further include receiving information indicating whether the external electronic device supports the binaural recording from the external electronic device.

According to an embodiment of the disclosure, the audio recording method may further include receiving a fourth user input requesting to play at least one of the first image or the second image, displaying an audio output selection screen related to the first audio data and the second audio data in response to the fourth user input, receiving a fifth user input selecting at least one of the first audio data or the second audio data through the audio output selection menu, and playing the selected image and the selected at least one audio in synchronization with each other in response to the fifth user input.

According to an embodiment of the disclosure, the audio recording method may further include receiving a sixth user input requesting to extract at least one of the first image or the second image, displaying an audio output selection screen related to the first audio data and the second audio data in response to the sixth user input, receiving a seventh user input selecting at least one of the first audio data or the second audio data through the audio output selection menu, and storing the selected image and the selected at least one audio in synchronization with each other in response to the seventh user input.

According to an embodiment of the disclosure, the audio recording method may further include displaying an image received from the other party of a call, a third image obtained from the first camera, and a fourth image obtained from the second camera, in a video call mode, receiving an eighth user input selecting the first earbud for the first camera and the second earbud for the second camera, for the video call mode, receiving fifth audio data from the first earbud and sixth audio data from the second earbud in response to the eighth user input, mixing the fifth audio data and the sixth audio data into a single audio stream, and transmitting the mixed audio stream to the other party.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or through a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online through an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first camera;
   a second camera;
   a display;
   a communication circuit;
   memory storing one or more computer programs; and
   one or more processors communicatively coupled to the first camera, the second camera, the display, the communication circuit, and the memory,
   wherein the one or more computer programs include computer-executable instructions that, when executed by the one or more processors, cause the electronic device to:
      display a first image obtained from the first camera and a second image obtained from the second camera through the display in a multiple camera recording mode,
      display an audio input selection screen related to a plurality of audio inputs through the display, wherein the audio input selection screen includes an item to select a microphone of the electronic device and an item to select an external electronic device connected to the electronic device through at least one Bluetooth communication link, receive a first user input selecting the external electronic device through the audio input selection screen, in response to the first user input, establish a first communication link and a second communication link for supporting binaural recording with a first earbud and a second earbud included in the external electronic device, respectively, through the communication circuit, receive first audio data obtained from the first earbud through the first communication link, and receive second audio data obtained from the second earbud through the second communication link, while performing a recording using the first camera and the second camera simultaneously, and store the first image in synchronization with the first audio data, and store the second image in synchronization with the second audio data.

2. The electronic device of claim 1, wherein the one or more computer programs further include computer-executable instructions that, when executed by the one or more processors, cause the electronic device to:

display an option selection screen corresponding to the first camera in response to the first user input, wherein the option selection screen includes an item to select the first earbud, an item to select the second earbud, and an item to select a stereo input, and receive a second user input selecting the first earbud through the option selection screen.

3. The electronic device of claim 2, wherein the one or more computer programs further include computer-executable instructions that, when executed by the one or more processors, cause the electronic device to:

receive a third user input selecting the stereo input through the option selection screen, in response to the third user input, receive third audio data obtained from the first earbud and fourth audio data obtained from the second earbud through the first and second communication links, generate stereo audio data by mixing the third audio data with the fourth audio data, and store the first image in synchronization with the stereo audio data, and store the second image in synchronization with the stereo audio data.

4. The electronic device of claim 1, wherein the audio input selection screen includes information indicating that the first earbud is detected for the first camera and/or information indicating that the second earbud is detected for the second camera.

5. The electronic device of claim 4, wherein the camera is configured to:

detect presence of the first earbud within a recording field of view of the first camera, or detect presence of the first earbud in a recording direction of the first camera by the communication circuit.

6. The electronic device of claim 1, wherein the first earbud includes at least one microphone for the binaural recording, and a second audio device includes at least one microphone for the binaural recording.

7. The electronic device of claim 1, wherein the one or more computer programs further include computer-executable instructions that, when executed by the one or more processors, cause the electronic device to receive information indicating whether the external electronic device supports the binaural recording from the external electronic device.

8. The electronic device of claim 1, wherein the one or more computer programs further include computer-executable instructions that, when executed by the one or more processors, cause the electronic device to:

receive a fourth user input requesting to play at least one of the first image or the second image, in response to the fourth user input, display an audio output selection screen related to the first audio data and the second audio data, receive a fifth user input selecting at least one of the first audio data or the second audio data through an audio output selection menu, and in response to the fifth user input, play a selected image and the selected at least one audio in synchronization with each other.

9. The electronic device of claim 8, wherein the one or more computer programs further include computer-executable instructions that, when executed by the one or more processors, cause the electronic device to:

receive a sixth user input requesting to extract at least one of the first image or the second image, in response to the sixth user input, display an audio output selection screen related to the first audio data and the second audio data, receive a seventh user input selecting at least one of the first audio data or the second audio data through the audio output selection menu, and in response to the seventh user input, store the selected image and the selected at least one audio in synchronization with each other.

10. The electronic device of claim 1, wherein the one or more computer programs further include computer-executable instructions that, when executed by the one or more processors, cause the electronic device to:

display an image received from the other party of a call, a third image obtained from the first camera, and a fourth image obtained from the second camera, in a video call mode, receive an eighth user input selecting the first earbud for the first camera and the second earbud for the second camera, for the video call mode, in response to the eighth user input, receive fifth audio data from the first earbud and sixth audio data from the second earbud, mix the fifth audio data and the sixth audio data into a single audio stream, and transmit the mixed audio stream to the other party.

11. An audio recording method performed by an electronic device, the method comprising:

displaying a first image obtained from a first camera and a second image obtained from a second camera through a display in a multiple camera recording mode;

displaying an audio input selection screen related to a plurality of audio inputs through the display, wherein the audio input selection screen includes an item to select a microphone of the electronic device and an item to select an external electronic device connected to the electronic device through at least one Bluetooth communication link;

receiving a first user input selecting the external electronic device through the audio input selection screen;

in response to the first user input, establishing a first communication link and a second communication link for supporting binaural recording with a first earbud and a second earbud included in the external electronic device, respectively;

receiving first audio data obtained from the first earbud through the first communication link, and receiving second audio data obtained from the second earbud through the second communication link, while performing a recording using the first camera and the second camera simultaneously; and storing the first image in synchronization with the first audio data, and storing the second image in synchronization with the second audio data.

12. The method of claim 11, further comprising:

displaying an option selection screen corresponding to the first camera in response to the first user input, wherein the option selection screen includes an item to select the first earbud, an item to select the second earbud, and an item to select a stereo input;

receiving a second user input selecting the first earbud through the option selection screen;

receiving a third user input selecting the stereo input through the option selection screen;

in response to the third user input, receiving third audio data obtained from the first earbud and fourth audio data obtained from the second earbud through the first and second communication links;

generating stereo audio data by mixing the third audio data with the fourth audio data; and storing the first image in synchronization with the stereo audio data, and storing the second image in synchronization with the stereo audio data.

13. The method of claim 11, wherein the audio input selection screen includes information indicating that the first earbud is detected for the first camera and/or information indicating that the second earbud is detected for the second camera, and wherein the audio recording method further comprises at least one of:

detecting presence of the first earbud within a recording field of view of the first camera, or detecting presence of the first earbud in a recording direction of the first camera by a communication circuit.

14. The method of claim 11, further comprising:

receiving a fourth user input requesting to play at least one of the first image or the second image;

in response to the fourth user input, displaying an audio output selection screen related to the first audio data and the second audio data;

receiving a fifth user input selecting at least one of the first audio data or the second audio data through an audio output selection menu; and in response to the fifth user input, playing a selected image and the selected at least one audio in synchronization with each other.

15. The method of claim 14, further comprising:

receiving a sixth user input requesting to extract at least one of the first image or the second image;

in response to the sixth user input, displaying an audio output selection screen related to the first audio data and the second audio data;

receiving a seventh user input selecting at least one of the first audio data or the second audio data through the audio output selection menu; and in response to the seventh user input, storing the selected image and the selected at least one audio in synchronization with each other.

16. The method of claim 14, further comprising:

displaying an image received from the other party of a call, a third image obtained from the first camera, and a fourth image obtained from the second camera, in a video call mode;

receiving an eighth user input selecting the first earbud for the first camera and the second earbud for the second camera, for the video call mode;

in response to the eighth user input, receiving fifth audio data from the first earbud and sixth audio data from the second earbud;

mixing the fifth audio data and the sixth audio data into a single audio stream; and transmitting the mixed audio stream to the other party.

17. The method of claim 11, wherein the first earbud includes at least one microphone for the binaural recording, and a second audio device includes at least one microphone for the binaural recording.

18. The method of claim 11, further comprising receiving information indicating whether the external electronic device supports the binaural recording from the external electronic device.

19. One or more non-transitory computer-readable storage media storing computer-executable instructions that, when executed by one or more processors of an electronic device, cause the electronic device to perform operations, the operations comprising:

displaying a first image obtained from a first camera and a second image obtained from a second camera through a display in a multiple camera recording mode;

displaying an audio input selection screen related to a plurality of audio inputs through the display, wherein the audio input selection screen includes an item to select a microphone of the electronic device and an item to select an external electronic device connected to the electronic device through at least one Bluetooth communication link;

receiving a first user input selecting the external electronic device through the audio input selection screen;

in response to the first user input, establishing a first communication link and a second communication link for supporting binaural recording with a first earbud and a second earbud included in the external electronic device, respectively;

receiving first audio data obtained from the first earbud through the first communication link, and receiving second audio data obtained from the second earbud through the second communication link, while performing a recording using the first camera and the second camera simultaneously; and storing the first image in synchronization with the first audio data, and storing the second image in synchronization with the second audio data.

20. The one or more non-transitory computer-readable storage media of claim 19, the operations further comprising:

displaying an option selection screen corresponding to the first camera in response to the first user input, wherein the option selection screen includes an item to select the first earbud, an item to select the second earbud, and an item to select a stereo input;

receiving a second user input selecting the first earbud through the option selection screen;

receiving a third user input selecting the stereo input through the option selection screen;

in response to the third user input, receiving third audio data obtained from the first earbud and fourth audio data obtained from the second earbud through the first and second communication links;

generating stereo audio data by mixing the third audio data with the fourth audio data; and storing the first image in synchronization with the stereo audio data, and storing the second image in synchronization with the stereo audio data.

* * * * *